(12) United States Patent
Venkatesha et al.

(10) Patent No.: US 9,786,042 B2
(45) Date of Patent: Oct. 10, 2017

(54) ALGORITHM FOR MEASURING WEAR PIN LENGTH USING AN INPUT IMAGE

(71) Applicant: Honeywell International Inc., Morristown, NJ (US)

(72) Inventors: Sharath Venkatesha, Minnetonka, MN (US); Ryan Andrew Lloyd, Burnsville, MN (US); Dinkar Mylaraswamy, Fridley, MN (US); Mark E. Behnke, South Bend, IN (US)

(73) Assignee: Honeywell International Inc., Morris Plains, NJ (US)

( * ) Notice: Subject to any disclaimer, the term of this patent is extended or adjusted under 35 U.S.C. 154(b) by 250 days.

(21) Appl. No.: 14/609,368

(22) Filed: Jan. 29, 2015

(65) Prior Publication Data

US 2016/0225130 A1  Aug. 4, 2016

(51) Int. Cl.
| | |
|---|---|
| *G06T 7/00* | (2017.01) |
| *B60T 17/22* | (2006.01) |
| *F16D 66/02* | (2006.01) |
| *G01B 5/00* | (2006.01) |
| *G01B 11/02* | (2006.01) |

(Continued)

(52) U.S. Cl.
CPC .......... *G06T 7/0004* (2013.01); *B60T 17/221* (2013.01); *F16D 66/02* (2013.01); *G01B 5/0028* (2013.01); *G01B 11/00* (2013.01); *G01B 11/02* (2013.01); *G01B 11/14* (2013.01); *G06K 9/4604* (2013.01)

(58) Field of Classification Search
None
See application file for complete search history.

(56) References Cited

U.S. PATENT DOCUMENTS

| | | | |
|---|---|---|---|
| 4,403,860 A | * | 9/1983 | Pryor ..................... G01B 11/00 33/542 |
| 4,845,763 A | | 7/1989 | Bandyopadhyay et al. |

(Continued)

FOREIGN PATENT DOCUMENTS

| | | |
|---|---|---|
| CN | 102937413 A | 2/2013 |
| DE | 4137737 C1 | 4/1993 |

(Continued)

OTHER PUBLICATIONS

Extended Search Report from counterpart European Application No. 16152793.2, dated Jun. 10, 2016, 7 pp.

(Continued)

*Primary Examiner* — Tsung-Yin Tsai
(74) *Attorney, Agent, or Firm* — Shumaker & Sieffert, P.A.

(57) ABSTRACT

In one example, the disclosure is directed to a method of determining a length of a wear pin in a brake assembly. The method includes obtaining an input image of a portion of the brake assembly, such as with a camera. The input image includes the wear pin and a reference object, and the reference object has a known dimension. A processor may determine, based on the input image, an image dimension of the reference object. The processor may determine, based on the input image, an image dimension of the wear pin. The processor may further determine, based on the image dimension of the reference object, the image dimension of the wear pin, and the known dimension of the reference object, an estimated measurement of the dimension of the wear pin.

30 Claims, 14 Drawing Sheets

Input Image After Measurement

(51) Int. Cl.
*G01B 11/00* (2006.01)
*G01B 11/14* (2006.01)
*G06K 9/46* (2006.01)

(56) References Cited

U.S. PATENT DOCUMENTS

| | | | |
|---|---|---|---|
| 4,931,949 | A | 6/1990 | Hernandez et al. |
| 5,189,625 | A | 2/1993 | Le Floch |
| 5,327,782 | A * | 7/1994 | Sato .................. B60T 17/22 340/454 |
| 5,825,017 | A * | 10/1998 | Pryor .................. F02F 1/24 250/208.1 |
| 5,871,391 | A * | 2/1999 | Pryor .................. F02F 1/24 356/600 |
| 6,917,720 | B1 * | 7/2005 | Caesar ............... G06K 9/3216 382/165 |
| 6,983,648 | B2 | 1/2006 | Grout |
| 7,086,503 | B2 | 8/2006 | Miller et al. |
| 7,222,521 | B1 | 5/2007 | Smith et al. |
| 7,333,219 | B2 * | 2/2008 | Yu .................... G01B 11/024 348/E5.025 |
| 7,505,607 | B2 | 3/2009 | Meunier et al. |
| 7,564,569 | B2 | 7/2009 | Mian et al. |
| 7,668,345 | B2 | 2/2010 | Kiyohara et al. |
| 8,370,030 | B1 | 2/2013 | Gurin |
| 8,599,044 | B2 | 12/2013 | Maggiore et al. |
| 8,773,289 | B2 * | 7/2014 | Maggiore ............. G08G 5/0008 340/425.5 |
| 2003/0102191 | A1 | 6/2003 | DeVlieg |
| 2004/0011596 | A1 * | 1/2004 | Miller ................. B60T 17/22 188/1.11 W |
| 2008/0028846 | A1 | 2/2008 | Heath et al. |
| 2009/0229926 | A1 | 9/2009 | Schaefer |
| 2012/0163930 | A1 | 6/2012 | Jeyaraman et al. |
| 2013/0083188 | A1 | 4/2013 | Mian et al. |
| 2014/0314276 | A1 * | 10/2014 | Wexler ................ G06T 7/602 382/103 |
| 2015/0025735 | A1 * | 1/2015 | Mylaraswamy ...... B60T 17/221 701/31.9 |
| 2015/0286215 | A1 * | 10/2015 | Alvarado, Jr. ........ B64D 45/00 701/3 |
| 2016/0027547 | A1 * | 1/2016 | Hattar ................. H01B 1/02 420/463 |

FOREIGN PATENT DOCUMENTS

| | | |
|---|---|---|
| DE | 102010035643 A1 | 6/2011 |
| EP | 1474618 B1 | 11/2004 |
| JP | 64455549 B1 | 2/1989 |
| JP | 2010008352 | 1/2010 |
| WO | 2013102900 A1 | 7/2013 |

OTHER PUBLICATIONS

"High Resolution Digital Inspection Camera with Recorder," Aircraft Spruce & Spcialty Co., retrieved from internet http://www.aircraftspruce.com/catalog/topages/hft-67980.php on Nov. 25, 2014, 2 pp.

"Industrial Vision Solutions: Single and Multiple Camera Solutions for Automated Machine Vision Applications," Teledyne DALSA, retrieved from internet https://teledynedalsa.com/public/ipd/brochures/2014_VisionSolutions_bro_web.pdf. on Dec. 24, 2014, 24 pp.

Hart et al., "Machine Vision Using Multi-Spectral Imaging for Undercarriage Inspection of Railroad Equipment," Proceedings of the 8th World Congress on Railway Research, May 2008, 8 pp.

Kim, "Automated Thickness Measuring System for Brake Shoe of Rolling Stock," IEEE Xplore Abstract, 2009 Workshop on Applications of Computer Vision (WACV), Dec. 7-8, 2009, 2 pp.

Luczak, "You Can't Manage what You Can't Measure," Railway-Age, vol. 201(10), Oct. 2000, 4 pp.

Mori et al., "Thickness Measuring System for Brake Shoe of Traveling Rolling Stock," Kawasaki Steel Technical Report No. 43, Oct. 2000, 3 pp.

Vernon, "Machine Vision—Automated Visual Inspection and Robot Vision," NASA ADS, The Smithsonian/NASA Astrophysics Data System, Prentice Hall, 1991, 1 pp. (Note: Applicant points out in accordance with MPEP 609.04(a) that the 1991 year of publication is sufficiently earlier than the effective U.S. filing date and any foreign priority date of Nov. 13, 2014 so that the particular month of publication is not in issue.).

Response to Examination Report dated Jun. 10, 2016, from counterpart European Application No. 16152793.2, filed Jan. 23, 2017, 22 pp.

Notice of Intent to Grant and Text Intended to Grant dated Aug. 1, 2017, from counterpart European Application No. 16152793.2, 67 pages.

* cited by examiner

ALGORITHM FOR MEASURING WEAR PIN LENGTH USING AN INPUT IMAGE

TECHNICAL FIELD

The disclosure relates to image metrology.

BACKGROUND

The common practice for periodically collecting brake wear pin measurements for airplanes is to do a visual inspection of the pin and, when the pin is flush with the housing, replace the wear pin and the brake assembly. The measurements are typically collected during brake overhaul, recorded manually on a paper data sheet, and sent to a central recording service. Errors may occur in manually measuring the wear pin and recording the measured length. The person measuring the pin's length may inconsistently round the figure, and he/she could enter the wrong length in a log. This system does not provide adequate data for wear monitoring and prediction of when brakes will need to be changed. This results in inadequate inventory planning and results in delays and cancellations.

SUMMARY

In general, this disclosure is directed to techniques and devices for determining a length of a wear pin in a brake assembly based on image analysis. In some examples, an image capture device, such as a camera, obtains an input image of a portion of the brake assembly. The input image includes the wear pin and a reference object, with the reference object having an actual dimension (i.e. a known length). A processor may determine, based on the input image, an image dimension of the reference object. Further, the processor may determine, based on the input image, an image dimension of the wear pin. The processor may further determine, based on the image dimension of the reference object, the image dimension of the wear pin, and the known dimension of the reference object, an estimated measurement of the dimension of the wear pin. The processor may be operatively coupled to the camera, meaning that this analysis may be done by the same device that captures the input image, or the processor may be operatively connected to a remote server that receives the input image from the image capture device.

In one example, the disclosure is directed to a method of determining a length of a wear pin in a brake assembly, the method comprising: obtaining an input image of a portion of the brake assembly, wherein the input image includes the wear pin and a reference object, and wherein the reference object has an known dimension; determining, based on the input image, an image dimension of the reference object; determining, based on the input image, an image dimension of the wear pin; and determining, based on the image dimension of the reference object, the image dimension of the wear pin, and the known dimension of the reference object, an estimated measurement of the dimension of the wear pin.

In another example, the disclosure is directed to a system configured to determine a length of a wear pin in a brake assembly, the system comprising: a camera configured to capture an input image of a portion of the brake assembly, wherein the input image includes the wear pin and a reference object, and wherein the reference object has an known dimension; and one or more processors configured to: determine, based on the input image, an image dimension of the reference object; determine, based on the input image, an image dimension of the wear pin; and determine, based on the image dimension of the reference object, the image dimension of the wear pin, and the known dimension of the reference object, an estimated measurement of the dimension of the wear pin.

In another example, the disclosure is directed to a computer-readable storage medium comprising instructions that, when executed by a processor, cause the processor to: obtain an input image of a portion of the brake assembly, wherein the input image includes the wear pin and a reference object, and wherein the reference object has an known dimension; determine, based on the input image, an image dimension of the reference object; determine, based on the input image, an image dimension of the wear pin; and determine, based on the image dimension of the reference object, the image dimension of the wear pin, and the known dimension of the reference object, an estimated measurement of the dimension of the wear pin.

The details of one or more examples of the disclosure are set forth in the accompanying drawings and the description below. Other features, objects, and advantages of the disclosure will be apparent from the description and drawings, and from the claims.

DETAILED DESCRIPTION

Techniques of this disclosure describe a system for automatically measuring wear pins based on an input image received from a computing device, such as a handheld device. This handheld device may perform image analysis to measure wear pin length during regular intervals throughout the life of the brake. The device may capture an image of the wear pin for each brake location on the aircraft. The device may associate the captured image and any associated measurements with a particular brake location on the aircraft and may identify the particular aircraft, for example, by recording the aircraft's tail number or location. The device may also enable the ability to capture other maintenance-related information. The data and images may then be uploaded to a central repository for analysis. Computer vision algorithms may measure the pin from images of the brake region. The server may then communicate results to the operators. A different version of the program may also perform all image processing locally on the hand held device and provide a real time pin length measurement to the user.

Techniques may further include quality analysis of input images to determine whether or not the images are suitable for the pin-measuring process. A user who photographs a brake wear pin (or any similar object) with the intent of measuring the length may be unaware of how the image's quality affects the measurement. As the images are captured using a handheld device, they may be of a degraded quality due to focus or motion blur. Similarly, the image may be over/under exposed. According to techniques of this disclosure, the image may be required to meet certain quality checks in order for the program to provide a measurement. That is, in some cases, the image may be so poor that obtaining a decent measurement is difficult, and the image should not be used for determining a wear pin length measurement. When the program is able to measure a pin, the user may benefit from receiving a confidence score or error interval to understand the probable accuracy. Although the image may represent the scene accurately, the scene may contain elements that are troublesome for the pin-measuring algorithm, such as dirt/grease/grit near the pin or a suboptimal camera pose. These unforeseen elements could cause the pin-measuring algorithm to partially fail. Therefore, software logic may be included to decide when an image is too poor to provide any measurement (i.e., no confidence), and give the user an expected error interval otherwise.

Automation of the process for measuring wear pins potentially has great benefits. Airline maintenance teams need a way to accurately record the history of a pin's length. Measurements which are better organized in a database help to maintain a track of the wear on the pin, which in turn can be used to detect performance and/or safety parameters, scheduled repair etc. An accurate history may enable airlines to have a better plan for replacing brakes.

Figure 1:
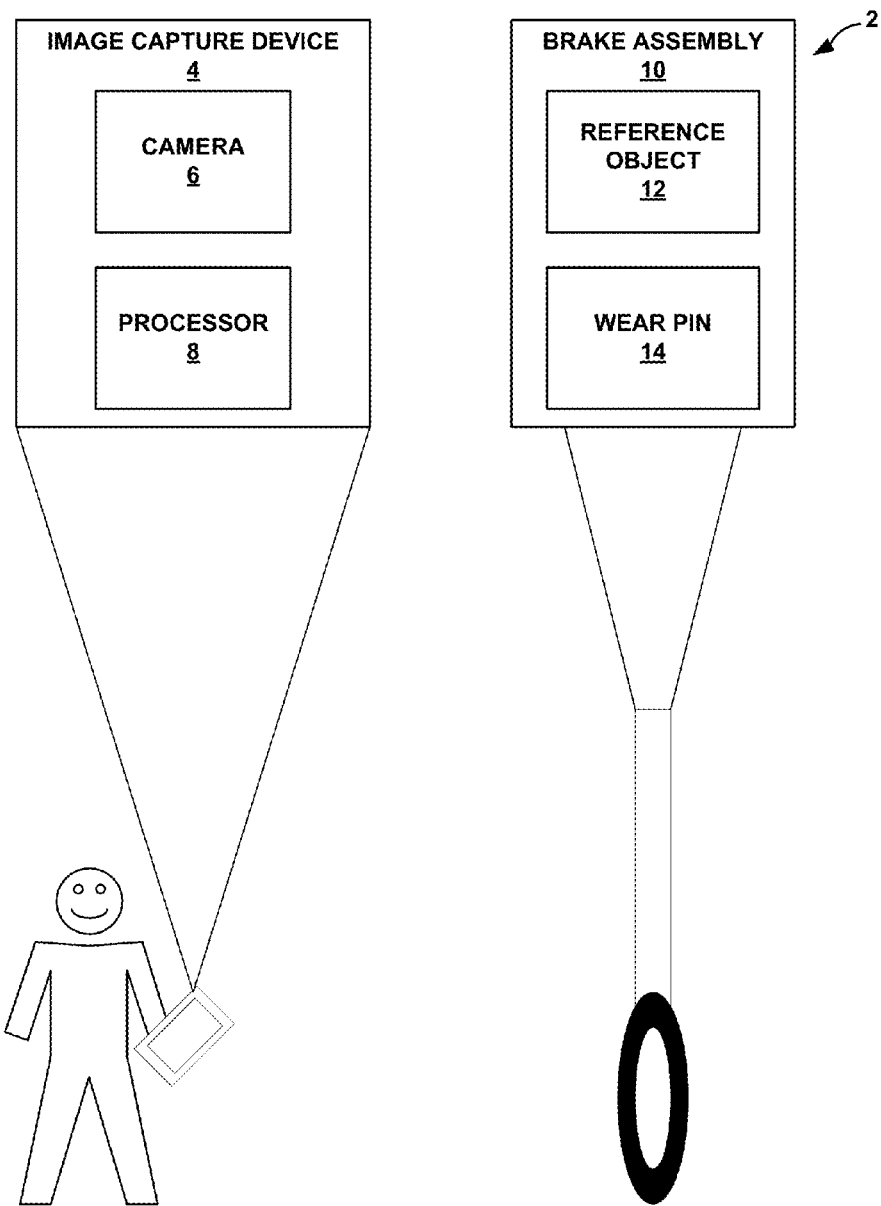
FIG. 1 is a conceptual diagram illustrating an example image capture device configured to measure a wear pin of a brake assembly, in accordance with one or more techniques of the current disclosure.

FIG. 1 is a conceptual diagram illustrating an example image capture device 4 configured to measure a wear pin 14 of a brake assembly 10, in accordance with one or more techniques of the current disclosure. Brake assembly 10 may be a brake assembly for a wheel in an aircraft. In general, brake assembly 10 includes reference object 12 and wear pin 14. In some examples, brake assembly 10 includes other objects not pictured in FIG. 1. For example, brake assembly 10 may further include one or more rotating discs (rotors), one or more stationary discs (stators), an end plate, and a pressure plate. These elements may be made of a carbon-metallic alloy, and may be referred to as a whole as the disc stack or heat pack. The stators may be attached to a torque tube that is bolted to the aircraft landing gear assembly. The rotors engage the wheel, with notches in the rotors fitting keys on the interior of a wheel hub. A wheel may turn on a wheel bearing, with the rotors spinning between the brake stators. Brake piston retraction springs maintain sufficient clearance between the rotors and the stators to permit the wheels to turn freely. Hydraulic actuating pistons may be built in the brake housing. When the brakes are activated, hydraulic pressure is increased within the pistons, moving them outward from the housing compressing the pressure plate, and reducing the clearance between the rotors and stators. The surfaces of the rotors and stators are pressed against each other, producing friction that slows the rotating wheel. While this is one example of brake assembly 10, other brake assemblies that use a wear pin, such as wear pin 14, may be used with techniques of the current disclosure.

Brake assembly 10 may include wear pin 14. A wear pin may be present for each wheel. Wear pin 14 may be a pin that extends from the pressure plate through the housing, protruding from the brake assembly. The amount of pin protrusion by wear pin 14 is indicative of the combined thickness of the rotor and stator discs. Parking brake pressure may be applied to accurately read wear pin length. In some examples, if the end of wear pin 14 on any brake assembly of the aircraft is flush with or below the housing that holds wear pin 14, the brake assembly may need to be replaced. In other examples, if wear pin 14 does not protrude from the housing more than a designated minimum length, such as 0.25 inches, the brake assembly may need to be replaced. Therefore, accurately measuring the length of wear pin 14 is important to the safe operation of an aircraft. Techniques of this disclosure describe measuring a wear pin. However, it should be appreciated that measuring wear pin 14 may include measuring the entirety of wear pin 14 or measuring only a portion of wear pin 14, such as a visible portion of wear pin 14.

Reference object 12 of brake assembly 10 may be any portion of brake assembly 10 that may be captured in the same image as wear pin 14 and has a fixed length regardless of the wear or life expectancy of brake assembly 10. In other words, it can be any object in brake assembly 10 for which a dimension of said object is known. Reference object 12 may also be a group of objects separated by a known distance. For instance, reference object 12 may be a housing or a bracket that holds wear pin 14.

Image capture device 4 may be used to execute techniques of this disclosure. Image capture device 4 may be any device capable of capturing an image and either capable of performing analysis on the image or capable of sending the image to a remote server capable of performing analysis on the image. In the example of FIG. 1, image capture device 4 may be a mobile phone. However, in other examples, image capture device 4 may be a tablet computer, a personal digital assistant (PDA), a laptop computer, a portable gaming device, a portable media player, an e-book reader, a watch, a television platform, a digital camera, or another type of computing device.

In the example of FIG. 1, image capture device 4 may include camera 6 configured to capture an input image. Camera 6 may be an optical instrument that records images that can be stored directly, transmitted to a remote server, or both. Camera 6 may be configured to capture still images or moving images. In the example of camera 6 being configured to capture moving images, camera 6 may further be configured to select a single frame from the set of frames captured in the moving image to use as the input image for the purpose of techniques of the current disclosure.

One or more processors 8 may implement functionality and/or execute instructions within image capture device 4. For example, processor 8 on image capture device 4 may receive and execute instructions stored by various storage devices that execute the functionality of various modules stored in the storage devices. These instructions executed by processor 8 may cause image capture device 4 to store information within the storage devices during program execution. Processor 8 may execute instructions of the modules to cause camera 6 of image capture device 4 to obtain an input image of brake assembly 10 and wear pin 14. Processor 8 may then use techniques of this disclosure to measure wear pin 14. In some examples, processor 8 may also be configured to transmit the input image to a remote server that will perform techniques described herein to measure wear pin 14.

In accordance with techniques of this disclosure, image capture device 4 may obtain an input image of a portion of brake assembly 10. In some examples, the input image includes wear pin 14 and reference object 12. Reference object 12 has a known dimension that is known by image capture device 4. The known dimension of reference object 12 may be provided by an external input, such as one or more of a specification sheet, a computer aided design, an engineering diagram, or a database of known dimensions. For example, reference object 12 may comprise a bracket configured to hold wear pin 14. The bracket may be a typical bracket holding wear pin 14 and have a length of 1.46 inches. While this is given as an example, reference object 12 may be any object in brake assembly 10 having a fixed or known length, and the length of reference object 12 may be any length suitable for the function of reference object 12 within brake assembly 10. A system could use multiple reference objects. In addition to using length, the system could use the 2D area of a reference object. In some examples, image capture device 4 may obtain the input image by capturing the input image using camera 6. In other examples, the reference object may be a bolt in the brake assembly, a distance between two or more bolts near the bracket, or a piston shaft. Further, while this disclosure may reference the "length" of reference object 12 or wear pin 14, it could be contemplated that length refers to a measurement of distance from a starting point to an ending point. Therefore, the measurement could actually be a length, a width, or a measurement of any portion of the object being measured.

Processor 8 may determine an image dimension of reference object 12 based on the input image. The dimension of reference object 12 may be any of a length, a width, a 2D area, a distance between two objects, or any other characteristic that may be measured using techniques described herein. As discussed above, reference object 12 has a known length. By determining the image dimension of reference object 12, processor 8 can determine a measurement ratio for the input image. In other words, processor 8 can determine how many inches each pixel represents. For example, if reference object 12 is measured to be 200 pixels, and the reference object is known to have a length of 1.46 inches, then processor 8 can determine that each pixel represents 0.0073 inches. This ratio may be used for other measurements taken based on the input image, including the measurement of the wear pin. The reference object may have approximately the same depth in the scene as the pin so that the conversion of pixels to real-world units derived from the reference object also applies to the pin. Determining the image dimension of reference object 12 is further discussed in regards to FIGS. 2-3J. While this disclosure references the image length of an object being in pixels, any unit of measurement for length can be used for the image length value, such as inches, centimeters, or points.

Processor 8 may further determine an image dimension of wear pin 14 based on the input image. The dimension of wear pin 14 may be any of a length, a width, a 2D area, or any other characteristic that may be measured using techniques described herein. Processor 8 may also determine an estimated measurement of the dimension of wear pin 14. In this determination, processor 8 may use the image dimension of wear pin 14, the image dimension of reference object 12, and the actual, known length of reference object 12. In general, the measurement ratio determined above can be used in conjunction with the image dimension of the wear pin to determine an estimated measurement of the dimension of wear pin 14. For instance, if it is determined that wear pin 14 has a length in pixels of 100 pixels, using the measurement ratio above of 0.0073 inches per pixel, processor 8 may determine that wear pin 14 has an estimated measurement of the dimension of 0.73 inches. A more detailed discussion of how image capture device 4 may determine these lengths is shown below with respect to FIGS. 2-3J. While this disclosure uses the term "estimated measurement," it should be appreciated that estimated measurement refers to the measured value gathered using techniques described herein. In some examples, the estimated measurement could be the precise, actual dimension of wear pin 14. In other examples, the estimated measurement could have an error that causes the estimated measurement to be longer or shorter than the actual dimension of wear pin 14. In other words, the term estimated measurement is the calculated measurement resulting from performing techniques described herein.

Figure 2:
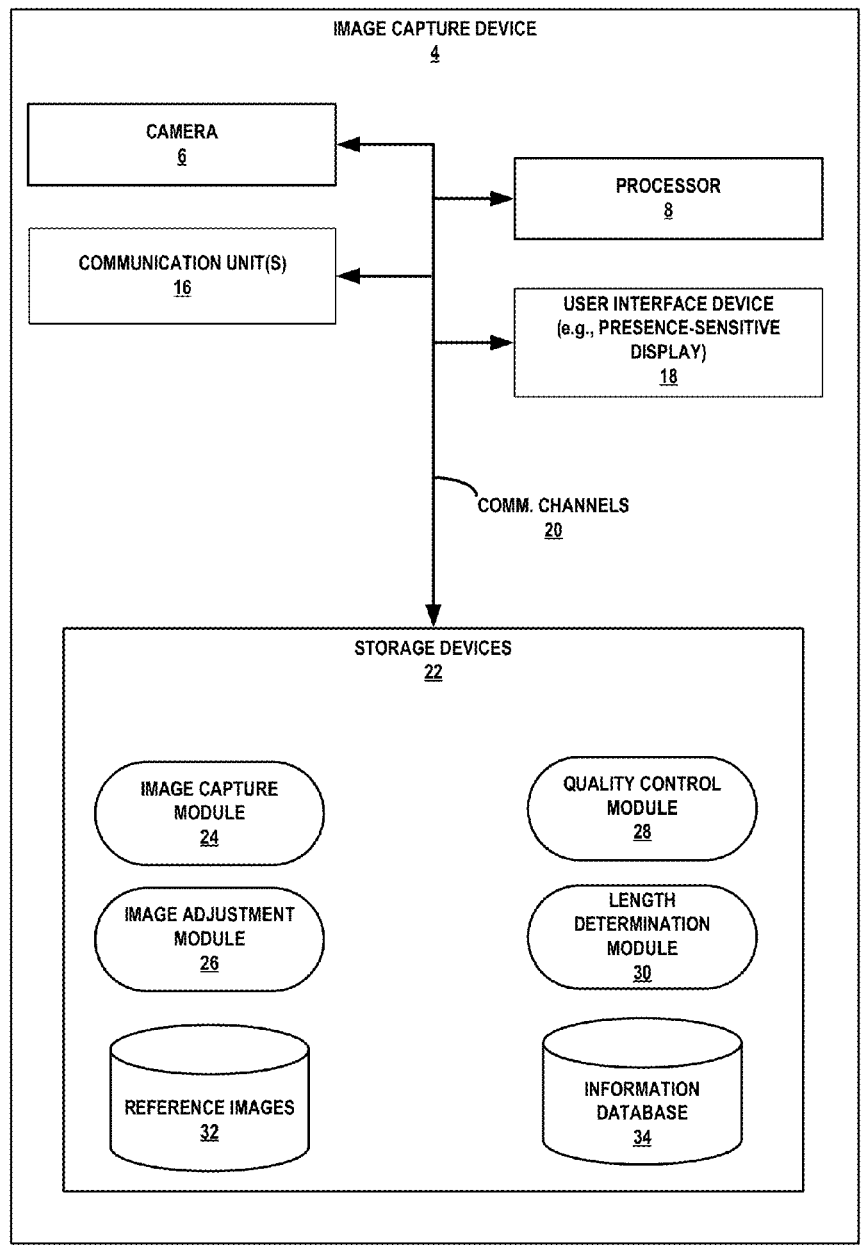
FIG. 2 is a block diagram illustrating a more detailed example of an image capture device configured to measure a wear pin of a brake assembly, in accordance with one or more techniques of the current disclosure.

FIG. 2 is a block diagram illustrating a more detailed example of an image capture device configured to measure a wear pin of a brake assembly, in accordance with one or more techniques of the current disclosure and within the context of FIG. 1. FIG. 2 illustrates only one particular example of image capture device 4, and many other examples of image capture device 4 may be used in other instances and may include a subset of the components included in example image capture device 4 or may include additional components not shown in FIG. 2.

Image capture device 4 may include additional components that, for clarity, are not shown in FIG. 2. For example, image capture device 4 may include a battery to provide power to the components of image capture device 4. Similarly, the components of image capture device 4 shown in FIG. 2 may not be necessary in every example of image capture device 4. For example, in some configurations, image capture device 4 may not include communication unit 16.

In the example of FIG. 2, image capture device 4 includes user interface device 18 (e.g., a presence-sensitive display), one or more processors 8, one or more communication units 16, and one or more storage devices 22. Storage devices 22 of image capture device 4 also include image capture module 24, image adjustment module 26, quality control module 28, and length determination module 30. Storage devices 22 may also include database of reference images 32 and information database 34, among other things. Communication channels 20 may interconnect each of the components 6, 8, 16, 18, 22, 24, 26, 28, 30, 32, and 34 for inter-component communications (physically, communicatively, and/or operatively). In some examples, communication channels 20 may include a system bus, a network connection, an inter-process communication data structure, or any other construct for communicating data.

One or more communication units 16 of image capture device 4 may communicate with external devices via one or more networks by transmitting and/or receiving network signals on the one or more networks. For example, image capture device 4 may use communication unit 16 to transmit and/or receive radio signals on a radio network such as a cellular radio network. Likewise, communication units 16 may transmit and/or receive satellite signals on a satellite network such as a GPS network. Examples of communication unit 16 include a network interface card (e.g. such as an Ethernet card), an optical transceiver, a radio frequency transceiver, a GPS receiver, or any other type of device that may send and/or receive information. Other examples of communication units 16 may include Bluetooth®, GPS, 3G, 4G, and Wi-Fi® radios found in mobile devices as well as Universal Serial Bus (USB) controllers.

In some examples, user interface device 18 of image capture device 4 may include functionality of various input devices and/or output devices. In some examples, user interface device 18 provides output to a user using tactile, audio, or video stimuli using a display device, such as a cathode ray tube (CRT) monitor, liquid crystal display (LCD), or any other type of device for generating visual output. In other examples, user interface device 18 may also provide a method of entering input to image capture device 4, such as presence-sensitive screen, touch-sensitive screen, etc.

One or more storage devices 22 within image capture device 4 may store information for processing during operation of image capture device 4. In some examples, storage device 22 is a temporary memory, meaning that a primary purpose of storage device 22 is not long-term storage. Storage devices 22 on image capture device 4 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 22, in some examples, also include one or more computer-readable storage media. Storage devices 22 may be configured to store larger amounts of information than volatile memory. Storage devices 22 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 22 may store program instructions and/or data associated with image capture module 24, image adjustment module 26, quality control module 28, and length determination module 30. Storage devices 22 may also store program instructions and/or data associated with reference images 32 or information database 34, among other things.

One or more processors 8 may implement functionality and/or execute instructions within image capture device 4. For example, processors 8 on image capture device 4 may receive and execute instructions stored by storage devices 22 that execute the functionality of image capture module 24, image adjustment module 26, quality control module 28, and length determination module 30. These instructions executed by processors 8 may cause image capture device 4 to store information, within storage devices 22 during program execution. Processors 8 may execute instructions of image capture module 24, image adjustment module 26, quality control module 28, and length determination module 30 to determine an estimated measurement of the dimension of wear pin 14 based on an input image. That is, items in storage device 22, such as image capture module 24, image adjustment module 26, quality control module 28, and length determination module 30, may be operable by processors 8 to perform various actions, including determining an estimated measurement of the dimension of wear pin 14 based on an image dimension of wear pin 14, an image dimension of reference object 12, and an known dimension of reference object 12 via an obtained input image, as shown in FIG. 1.

In accordance with techniques of this disclosure, processor 8 may execute image capture module 24 to obtain an input image of a portion of the brake assembly (e.g., brake assembly 10 of FIG. 1). The input image includes a wear pin (e.g., wear pin 14 of FIG. 1) and a reference object (e.g., reference object 12 of FIG. 1). Reference object 12 has an actual, known length. For example, reference object 12 may comprise a bracket configured to hold wear pin 14. The bracket may be a typical bracket holding wear pin 14 and have a length of 1.46 inches. While this is given as an example, reference object 12 may be any object in brake assembly 10 having a fixed or known length, and the length of reference object 12 may be any length suitable for the function of reference object 12 within brake assembly 10. In some examples, image capture module 24 may capture the input image using camera 6. In some further examples, image capture module 24 may output, on a display operatively connected to camera 6 (e.g., user interface device 18), a prompt to capture the input image. Further, in some examples, image capture module 24 may output, on a preview display operatively connected to the camera (e.g., user interface device 18), a graphical outline overlaid on a preview of the input image. In some examples, the graphical outline may be shaped in the form of a rectangle, a square, a circle, a wear-pin shaped outline, a reference object-shaped outline, or any other suitable shape. The graphical outline may be displayed such that the portion of brake assembly 10 in the input image should fall within the graphical outline when the input image is captured, meaning that the graphical outline is an optimal area for the user to place reference object 12 and wear pin 14 when capturing the input image. In other examples, the reference object may be a bolt in the brake assembly, a distance between two or more bolts near the bracket, or a piston shaft.

In some examples, communication unit 16 may send the input image to a server. In such an example, a computing device operatively connected to the server may be configured to utilize techniques described herein to determine the image dimension of the reference object, the image dimension of the wear pin, and the estimated measurement of the dimension of the wear pin. In other words, while techniques of this disclosure are described herein as being performed on the same computing device that captures the input image, in some examples, image capture device 4 may only be configured to capture the input image and send the input image to a remote server that is configured to analyze the input image using techniques of this disclosure. While this disclosure references the image length of an object being in pixels, any unit of measurement for length can be used for the image length value, such as inches, centimeters, or points.

In some examples, processor 8 may execute image adjustment module 26 to edit the input image such that the wear pin is in the optimal state (e.g., optimal position, contrast, color, etc.) for processor 8 to determine the length of wear pin 14. For example, processor 8 may execute image adjustment module 26 to rotate the input image such that wear pin 14 is approximately horizontal in the rotated input image. In some examples, in rotating the input image, processor 8 may execute image adjustment module 26 to perform edge detection analysis on the input image to detect one or more near-vertical edges of brake assembly 10 and rotate the input image such that the detected edges of brake assembly 10 are approximately vertical. In other examples, image adjustment module 26 may rotate the input image such that wear pin 14 is approximately vertical in the rotated input image. In such examples, in rotating the input image, processor 8 may execute image adjustment module 26 to perform edge detection analysis on the input image to detect one or more near-horizontal edges of brake assembly 10 and rotate the input image such that the detected edges of brake assembly 10 are approximately horizontal. In some examples, wear pin 14 is approximately horizontal after the rotation and will be measured from left to right. However, in other examples, wear pin 14 is approximately horizontal and will be measured from right to left.

In some examples, processor 8 may execute image adjustment module 26 to convert the input image to a greyscale image. By converting the input image to a greyscale image, the storage space needed to hold the file in a computing device may be smaller. Especially in instances where the input image is transferred between an image capture device and a remote server, a greyscale image may allow for faster transmissions due to the smaller file size. Further, generally, wear pin 14 and reference object 12 overlap one another and are distinguishable by what shade of grey each object is. Typically, wear pin 14 tends to be a dark color, and reference object 12 tends to be a light color, though some examples could have a light color wear pin and a dark color reference object. This means that a greyscale image does not impact the ability to discern wear pin 14 from the reference object during the execution of techniques of this disclosure. The conversion to greyscale may also accelerate image analysis techniques. For example, many image analysis techniques only operate on single-channel images.

In some examples, processor 8 may execute image adjustment module 26 to apply a smoothing algorithm to the input image. In some examples, the smoothing algorithm may be a bilateral filter. A bilateral filter is a non-linear, edge-preserving, noise-reducing smoothing filter for images. By preserving the edges in the image, the length of wear pin 14 will not be altered due to edits made to the input image. Instead, the bilateral filter will merely smooth the image such that it is easier to discern wear pin 14 from reference object 12. As discussed above, wear pin 14 and reference object 12 may overlap one another and may be distinguishable by color or intensity. By applying the bilateral filter, processor 8 may be able to more effectively determine where the edges of wear pin 14 and reference object 12 are in the input image, allowing for more precise measurements.

In some examples, processor 8 may execute image adjustment module 26 to apply an equalization algorithm to the input image based on one or more lighting conditions. The lighting conditions of the environment in which brake assembly 10 is present may greatly affect the contrast of an image taken in that environment. As discussed above, the ability of processor 8 to discern wear pin 14 from reference object 12 will greatly affect the precision of a measurement for wear pin 14. Therefore, improving the contrast level of the input image may allow for greater precision in measurements. In some examples, image adjustment module 26 may increase the contrast of the input image if the lighting conditions are too dark. Further, image adjustment module 26 may decrease the contrast of the input image if the lighting conditions are too bright. The equalization allows all images to appear similar, regardless of their original lighting conditions or contrast.

Processor 8 may execute length determination module 30 to determine, based on the input image, an image dimension of the reference object. The dimension of reference object 12 may be any of a length, a width, a 2D area, a distance between two objects, or any other characteristic that may be measured using techniques described herein. To determine the image dimension of the reference object, processor 8 may execute length determination module 30 to detecting a first point on the reference object and a second point on the reference object in the input image. The first point and the second point may be on a perimeter of the reference object and may be on opposite extremes of the reference object. The first point may not intersect with the second point, meaning that the first point and the second point are two discrete, non-connecting, approximately parallel line segments. Generally, the first point and the second point may be opposite edges of reference object 12. For example, where reference object 12 is a trapezoidal bracket holding wear pin 14, the first point and the second point may be the two opposite bases of the trapezoidal bracket. Processor 8 may further execute length determination module 30 to determine a number of pixels in a horizontal row that separates the first point and the second point. Further, processor 8 may execute length determination module 30 to determine a length per pixel ratio for the input image based on the number of pixels that separates the first point and the second point and the known dimension of the reference object. The known dimension of reference object 12 may be provided by an external input, such as one or more of a specification sheet, a computer aided design, an engineering diagram, or a database of known dimensions. For example, if reference object 12 is measured to be 200 pixels, and the reference object is known to have a length of 1.46 inches, then processor 8 can determine that each pixel represents 0.0073 inches. This ratio may be used for other measurements taken based on the input image, including the measurement of the wear pin. In some examples, the first point and the second point may be determined using an edge detection algorithm, such as a Sobel filter.

In some examples, to detect the first point and the second point, processor 8 may first identify reference object 12. To do so, processor 8 may execute length determination module 30 to compare one or more portions of the input image to a template of reference object 12. Such a template of reference object 12 may be stored in reference images database 32 of storage devices 22. Further, processor 8 may execute length determination module 30 to determine, based on the one or more comparisons, a portion of the input image that most closely matches the template of reference object 12 and detect the first point and the second point based on the portion of the input image that most closely matches the template of reference object 12.

Processor 8 may execute length determination module 30 to determine, based on the input image, an image dimension of wear pin 14. The dimension of wear pin 14 may be any of a length, a width, a 2D area, or any other characteristic that may be measured using techniques described herein. In determining the image dimension of wear pin 14, processor 8 may execute length determination module 30 to detect a location of wear pin 14. Processor 8 may execute length determination module 30 to detect a first edge of the wear pin in the input image. The first edge represents a fixed end of the wear pin in a bracket assembly. In some examples, the first edge may be determined using an edge detection algorithm, such as a Sobel filter. Further, processor 8 may execute length determination module 30 to identify one or more line segments near wear pin 14 starting at the first edge. Processor 8 may further execute length determination module 30 to identify one or more clusters of the one or more line segments and identify a cluster of the one or more clusters that is coincident with wear pin 14. Processor 8 may further execute length determination module 30 to merge each line segment in the cluster coincident with wear pin 14 and determine a number of pixels corresponding to the length of the merged line segment. In some examples, the identification of one or more horizontal line segments may be accomplished through the application of an edge detection kernel to detect approximately horizontal edges, a determination of pixels with responses above a threshold as horizontal edges, and applying a Hough line transform to the each horizontal edge. Processor 8 may execute length determination module 30 to determine a number of pixels in the largest cluster. In cases when the pin is short and contains relatively few pixels, other measures, such as the vertical centrality of each cluster and compactness, may help identify the pin. Though described above as determining horizontal line segments, techniques of this disclosure could also be utilized for a wear pin that is vertical in an input image.

Processor 8 may execute length determination module 30 to determine, based on the image dimension of the reference object, the image dimension of the wear pin, and the known dimension of the reference object, an estimated measurement of the dimension of the wear pin. In some examples, processor 8 may output, on a display operatively connected to image capture device 4 (e.g., user interface device 18) and based on the image dimension of wear pin 14 and the determined estimated measurement of the dimension of wear pin 14, a graphical representation of the determined estimated measurement of the dimension of the wear pin. For example, the graphical representation of the determined estimated measurement of the dimension of wear pin 14 may be a line segment displayed overlaid on top of an approximate location of wear pin 14 in the input image.

In some examples, processor 8 may output, on user interface device 18, a confirmation prompt that the graphical representation is a suitable representation of the determined estimated measurement of the dimension of wear pin 14. This may allow a user to have more visual control of the measurement. If certain conditions in the input image cause the techniques of this disclosure to return an erroneous measurement, the user may be able to rectify this before submitting the measurement by seeing the graphical representation overlaid on top of the discerned and measured wear pin 14.

In some examples, processor 8 may execute length determination module 30 to determine, based on the determined estimated measurement of the dimension of wear pin 14, an estimated remaining life expectancy for wear pin 14. This would provide the user an indication of when wear pin 14 and brake assembly 10 will be in need of repair. In some examples, the estimated remaining life expectancy is an estimated time until replacement for the wear pin. In other examples, the estimated remaining life expectancy is an estimated number of uses until replacement. Further, the life expectancy of wear pin 14 may be different depending on the type of vehicle for which wear pin 14 is being measured. For instance, if the vehicle is a large, passenger aircraft, a wear pin length of 2 inches may have a shorter remaining life expectancy than a wear pin length of 2 inches for a vehicle that is a small, private airplane. Therefore, processor 8 may execute length determination module 30 to determine the estimated remaining life expectancy for the wear pin further based on a vehicle type.

In some examples, image capture module 24 may further obtain a one or more subsequent input images (such as via camera 6). The one or more subsequent input images may identify a vehicle associated with brake assembly 10. Processor 8 may execute length determination module 30 to retrieve one or more stored dimensions of wear pin 14 and save the estimated measurement of the dimension as a most recent stored dimension for wear pin 14 of the vehicle associated with brake assembly 10. This stored dimension may be saved in information database 34 of image capture device 4. In other examples, where image capture device 4 communicates with a remote server that determines the estimated measurement of the dimension of wear pin 14, information database 34 may be stored on the remote server. Based on the estimated measurement of the dimension and the one or more stored dimensions in information database 34, processor 8 may further determine an estimated life expectancy of wear pin 14 based on a rate of change. By implementing this feature, studies on the durability of various wear pins can be conducted, as each wear pin for each vehicle will have a history.

Techniques may further include quality analysis of input images based on various quality estimation parameters derived throughout the measurement process. For instance, a user who photographs a brake wear pin (or any similar object) with the intent of measuring the length is unaware of how the image's quality affects the measurement. As the images are captured using a handheld device, they may be of a degraded quality due to focus or motion blur. Similarly, the image may be over/under exposed. The image may be required to meet certain quality checks in order for the program to provide a measurement. That is, in some cases, the image may be so poor that obtaining a decent measurement is difficult, and the image should be thrown away. When the program is able to measure a pin, the user may benefit from receiving a confidence score or error interval to understand the probable accuracy. Although the image may represent the scene accurately, the scene may contain elements that are troublesome for the pin-measuring algorithm, such as dirt/grease/grit near the pin or a sub-optimal camera pose. These unforeseen elements could cause the pin-measuring algorithm to partially fail. Therefore, software logic may be included to decide when an image is too poor to provide any measurement (i.e., no confidence), and give the user an expected error interval otherwise.

In accordance with techniques of this disclosure, processor 8 may execute quality control module 28 to determine a quality estimation parameter for the input image. Further, processor 8 may execute quality control module 28 to determine whether the quality estimation parameter is within an acceptable range. The term "acceptable range" can be any pre-defined or dynamically defined range of values for which an input image is deemed to be of acceptable quality. In response to the quality estimation parameter not being within the acceptable range, processor 8 may execute quality control module 28 to send an indication to a user. In such examples, processor 8 may prompt a user to re-capture the input image using different camera extrinsic properties, such as camera position, camera motion, flash, or other camera settings. In other examples, processor 8 may prompt the user to capture one or more subsequent input images of the portion of the brake assembly with different camera extrinsic properties. If a higher quality input image is captured, techniques described herein may be performed on that input image. However, in response to the quality estimation parameter being within the acceptable range, processor 8 may execute length determination module 30 to determine the estimated measurement of the dimension of wear pin 14 based on the input image, as described in detail above. Processor 8 may further execute quality control module 28 to dynamically update the acceptable range based on one or more environmental conditions, such as lighting or presence of foreign substances (e.g., grease, sludge, scrapes, paint, etc.). In some examples, the quality estimation parameter is determined by the same device that captures the input image (i.e. image capture device 4). In other examples, the quality estimation parameter is determined by a remote server that receives the input image from image capture device 4.

In some examples, the quality estimation parameter may be determined based on a contrast of the input image. In such examples, determining whether the quality estimation parameter is within the acceptable range may include processor 8 executing quality control module 28 to convert the input image to a greyscale image. Processor 8 may also execute quality control module 28 to determine an average greyscale value in the greyscale image and to determine a standard deviation of greyscale values in the greyscale image. Processor 8 may then determine that the quality estimation parameter is not within the acceptable range if the standard deviation of greyscale values does not fall within a lower limit and an upper limit. Conversely, processor 8 may determine that the quality estimation parameter is within the acceptable range if the standard deviation of greyscale values falls within the lower limit and the upper limit. If the contrast of the input image is too high or too low, processor 8 and length determination module 30 may not be capable of discerning wear pin 14 and reference object 12 for the purposes of measuring the objects in accordance with techniques described herein. Therefore, measuring the contrast before measuring the objects may save time and processing power when the input image does not meet the requisite quality.

In some examples, the quality estimation parameter may be determined based on a brightness of the input image. In such examples, determining whether the quality estimation parameter is within the acceptable range may include processor 8 executing quality control module 28 to convert the input image to a greyscale image. Processor 8 may also execute quality control module 28 to determine an average greyscale value in the greyscale image. Processor 8 may then determine that the quality estimation parameter is not within the acceptable range if the average greyscale value does not fall within a lower limit and an upper limit. Conversely, processor 8 may determine that the quality estimation parameter is within the acceptable range if the average greyscale value falls within the lower limit and the upper limit. If the average brightness of the input image is too high or too low, processor 8 and length determination module 30 may not be capable of discerning wear pin 14 and reference object 12 for the purposes of measuring the objects in accordance with techniques described herein. Therefore, measuring the brightness before measuring the objects may save time and processing power when the input image does not meet the requisite quality.

In other examples, the quality estimation parameter may be determined based on a blurriness of the input image. In such examples, determining whether the quality estimation parameter is within the acceptable range may include dividing the input image into a plurality of windows. Each window may overlap a portion of each window horizontally adjacent to the respective window. Processor 8 may also execute quality control module 28 to determine a blurriness parameter for each window of the plurality of windows based on a magnitude of a Fast Fourier transform algorithm applied over a percentile of available spatial frequencies. Processor 8 may execute quality control module 28 to determine the quality estimation parameter for the input image as a weighted function of the blurriness parameter for each window. In some examples, the weighted function of the blurriness parameters may be a mean, a minimum function, or a maximum function. In other examples, the weighted function comprises a weight associated with the blurriness parameter each window, wherein the weight associated with the blurriness parameter for a window of the plurality of windows that contains the wear pin is a non-zero value, and wherein the weight associated with the blurriness parameter for each window of the plurality of windows that does not contain the wear pin is a zero value. In other words, only the window that contains wear pin 14 in the input image is used for blurriness quality prediction. Processor 8 may determine that the quality estimation parameter is not within the acceptable range if the quality estimation parameter is below a lower limit of blurriness. Conversely, processor 8 may determine that the quality estimation parameter is within the acceptable range if the quality estimation parameter is above the lower limit of blurriness. In various examples, the input image may be divided into any number of windows, including one of nine windows, sixteen windows, or twenty-five windows. In some examples, the blurriness parameter for each window is an average of the blurriness for each pixel in the respective window. In other examples, the blurriness parameter for each window is a minimum blurriness for each pixel in the respective window. If the input image is too blurry, processor 8 and length determination module 30 may not be capable of discerning wear pin 14 and reference object 12 for the purposes of measuring the objects in accordance with techniques described herein. Therefore, measuring the blurriness before measuring the objects may save time and processing power when the input image does not meet the requisite quality.

In some examples, processor 8 may execute quality control module 28 to determine a confidence measurement of the estimated measurement of the dimension of the wear pin based on the quality estimation parameter. In some further examples, processor 8 may execute quality control module 28 to prompt a user, via user interface device 18, to re-capture the input image if the confidence measurement is below a threshold confidence level. Processor 8 may further execute quality control module 28 to present an error boundary, via user interface device 18, based on the quality estimation parameter. This may further assist a user in determining whether to accept the measurement provided by image capture device 4 or to re-capture the image using camera 6.

FIGS. 3A-3J are example input images of a brake assembly at various points throughout the process of measuring a wear pin, in accordance with one or more techniques of the current disclosure. The input images depicted by FIGS. 3A-3J should be seen as example images only. Each image along these various points of the process of measuring a wear pin may be unique. Further, some steps depicted by FIGS. 3A-3J may not be taken in executing instances of the techniques described herein. For instance, one example instance of the techniques described in the current disclosure may not convert the input image to a greyscale image. Further, steps not depicted by FIGS. 3A-3J may be performed during an instance of the techniques described herein. For instance, processor 8 may output a graphical outline overlaid on a preview of the input image, with the graphical outline being displayed such that the portion of brake assembly 10 in the input image should fall within the graphical outline when the input image is captured.

Techniques may further include quality analysis of input images based on various quality estimation parameters derived throughout the measurement process. For instance, a user who photographs a brake wear pin (or any similar object) with the intent of measuring the length is unaware of how the image's quality affects the measurement. As the images are captured using a handheld device, they may be of a degraded quality due to focus or motion blur. Similarly, the image may be over/under exposed. The image may be required to meet certain quality checks in order for the program to provide a measurement. That is, in some cases, the image may be so poor that obtaining a decent measurement is difficult, and the image should be thrown away.

When the program is able to measure a pin, the user may benefit from receiving a confidence score or error interval to understand the probable accuracy. Although the image may represent the scene accurately, the scene may contain elements that are troublesome for the pin-measuring algorithm, such as dirt/grease/grit near the pin or a sub-optimal camera pose. These unforeseen elements could cause the pin-measuring algorithm to partially fail. Therefore, software logic may be included to decide when an image is too poor to provide any measurement (i.e., no confidence), and give the user an expected error interval otherwise.

Figure 3A:
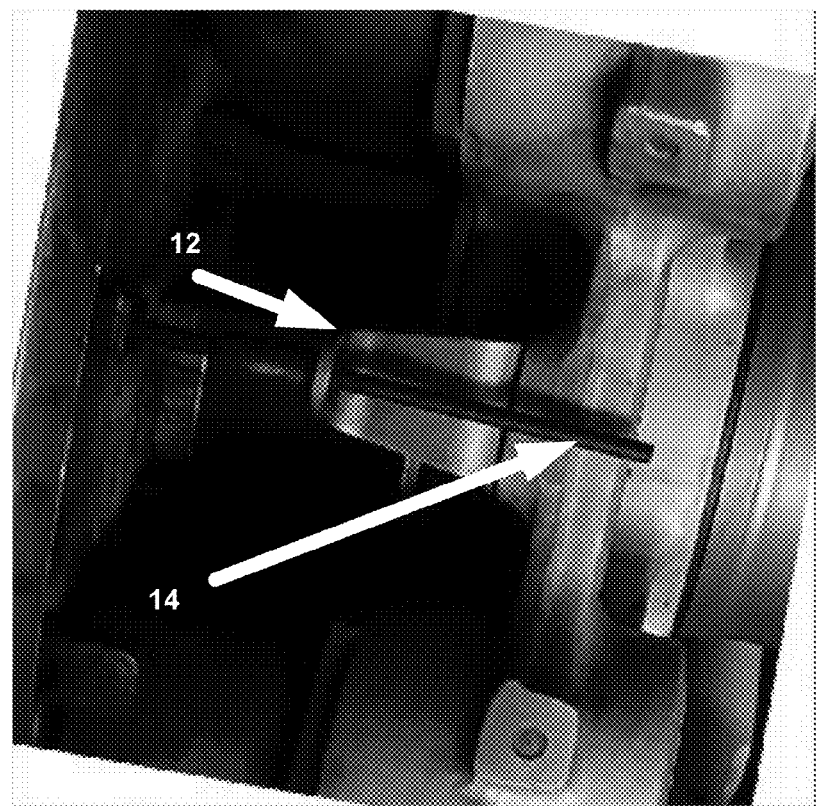
FIGS. 3A-3J are example images of a brake assembly at various points throughout the process of measuring a wear pin, in accordance with one or more techniques of the current disclosure.

FIG. 3A is an example input image as it is taken by an image capture device. In the example of FIG. 3A, wear pin 14 and reference object 12 are shown in the image after it has been obtained by image capture device 4. This will be the general input image which will be used to measure wear pin 14.

In accordance with techniques of this disclosure, processor 8 may execute image capture module 24 to may obtain an input image of a portion of the brake assembly (e.g., brake assembly 10 of FIG. 1). The input image includes a wear pin (e.g., wear pin 14 of FIG. 1) and a reference object (e.g., reference object 12 of FIG. 1). Reference object 12 has an actual, known length. For example, reference object 12 may comprise a bracket configured to hold wear pin 14. The bracket may be a typical bracket holding wear pin 14 and have a length of 1.46 inches. While this is given as an example, reference object 12 may be any object in brake assembly 10 having a fixed or known length, and the length of reference object 12 may be any length suitable for the function of reference object 12 within brake assembly 10. In some examples, image capture module 24 may capture the input image using camera 6. In some further examples, image capture module 24 may output, on a display operatively connected to camera 6 (e.g., user interface device 18), a prompt to capture the input image. Further, in some examples, image capture module 24 may output, on a preview display operatively connected to the camera (e.g., user interface device 18), a graphical outline overlaid on a preview of the input image. The graphical outline may be displayed such that the portion of brake assembly 10 in the input image should fall within the graphical outline when the input image is captured. In other examples, the reference object may be a bolt in the brake assembly, a distance between two or more bolts near the bracket, or a piston shaft.

In some examples, communication unit 16 may send the input image to a server. In such an example, a computing device operatively connected to the server may configured to utilize techniques described herein to determine the image dimension of the reference object, the image dimension of the wear pin, and the estimated measurement of the dimension of the wear pin. In other words, while techniques of this disclosure are described herein as being performed on the same computing device that captures the input image, in some examples, image capture device 4 may only be configured to capture the input image and send the input image to a remote server that is configured to analyze the input image using techniques of this disclosure.

In accordance with techniques of this disclosure, processor 8 may execute quality control module 28 to determine a quality estimation parameter for the input image. Further, processor 8 may execute quality control module 28 to determine whether the quality estimation parameter is within an acceptable range. In response to the quality estimation parameter not being within the acceptable range, processor 8 may execute quality control module 28 to send an indication to a user. In such examples, processor 8 may prompt a user to re-capture the input image using different camera extrinsic properties, such as camera position, camera motion, flash, or other camera settings. In other examples, processor 8 may prompt the user to capture one or more subsequent input images of the portion of the brake assembly with different camera extrinsic properties. If a higher quality input image is captured, techniques described herein may be performed on that input image. However, in response to the quality estimation parameter being within the acceptable range, processor 8 may execute length determination module 30 to determine the estimated measurement of the dimension of wear pin 14 based on the input image, as described in detail above. Processor 8 may further execute quality control module 28 to dynamically update the acceptable range based on one or more environmental conditions, such as lighting or presence of foreign substances (e.g., grease, sludge, scrapes, paint, etc.). In some examples, the quality estimation parameter is determined by the same device that captures the input image (i.e. image capture device 4). In other examples, the quality estimation parameter is determined by a remote server that receives the input image from image capture device 4.

In other examples, the quality estimation parameter may be determined based on a blurriness of the input image. In such examples, determining whether the quality estimation parameter is within the acceptable range may include dividing the input image into a plurality of windows. Each window may overlap a portion of each window horizontally adjacent to the respective window. Processor 8 may also execute quality control module 28 to determine a blurriness parameter for each window of the plurality of windows based on a magnitude of a Fast Fourier transform algorithm applied over a percentile of available spatial frequencies. Processor 8 may execute quality control module 28 to determine the quality estimation parameter for the input image as a weighted function of the blurriness parameter for each window. In some examples, the weighted function of the blurriness parameters may be a mean, a minimum function, or a maximum function. In other examples, the weighted function comprises a weight associated with the blurriness parameter each window, wherein the weight associated with the blurriness parameter for a window of the plurality of windows that contains the wear pin is a non-zero value, and wherein the weight associated with the blurriness parameter for each window of the plurality of windows that does not contain the wear pin is a zero value. In other words, only the window that contains wear pin 14 in the input image is used for blurriness quality prediction. Processor 8 may determine that the quality estimation parameter is not within the acceptable range if the quality estimation parameter is below a lower limit of blurriness. Conversely, processor 8 may determine that the quality estimation parameter is within the acceptable range if the quality estimation parameter is above the lower limit of blurriness. In various examples, the input image may be divided into any number of windows, including one of nine windows, sixteen windows, or twenty-five windows. In some examples, the blurriness parameter for each window is an average of the blurriness for each pixel in the respective window. In other examples, the blurriness parameter for each window is a minimum blurriness for each pixel in the respective window. If the input image is too blurry, processor 8 and length determination module 30 may not be capable of discerning wear pin 14 and reference object 12 for the purposes of measuring the objects in accordance with techniques described herein. Therefore, measuring the blurriness before measuring the objects may save time and processing power when the input image does not meet the requisite quality.

Figure 3B:
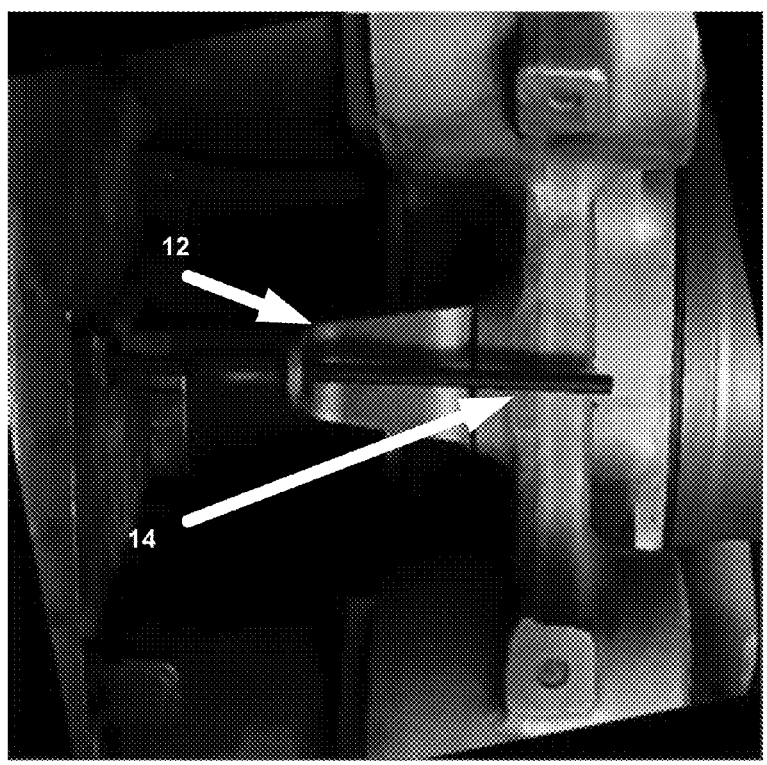

FIG. 3B is an example input image after roll correction has been performed. Processor 8 may rotate the image in order to bring wear pin 14 as close to a horizontal line or a vertical line as possible. In the example of FIG. 3B, wear pin 14 is now approximately horizontal. For the purposes of this application, approximately horizontal means that the wear pin 14 is within ~5 degrees of horizontal.

For example, processor 8 may execute image adjustment module 26 to rotate the input image such that wear pin 14 is approximately horizontal in the rotated input image. In some examples, in rotating the input image, processor 8 may execute image adjustment module 26 to perform edge detection analysis on the input image to detect one or more edges of wear pin 14 and rotate the input image such that the detected edges of wear pin 14 are approximately vertical. In other examples, image adjustment module 26 may rotate the input image such that wear pin 14 is approximately vertical in the rotated input image. In such examples, in rotating the input image, processor 8 may execute image adjustment module 26 to perform edge detection analysis on the input image to detect one or more edges of wear pin 14 and rotate the input image such that the detected edges of wear pin 14 are approximately horizontal.

Figure 3C:
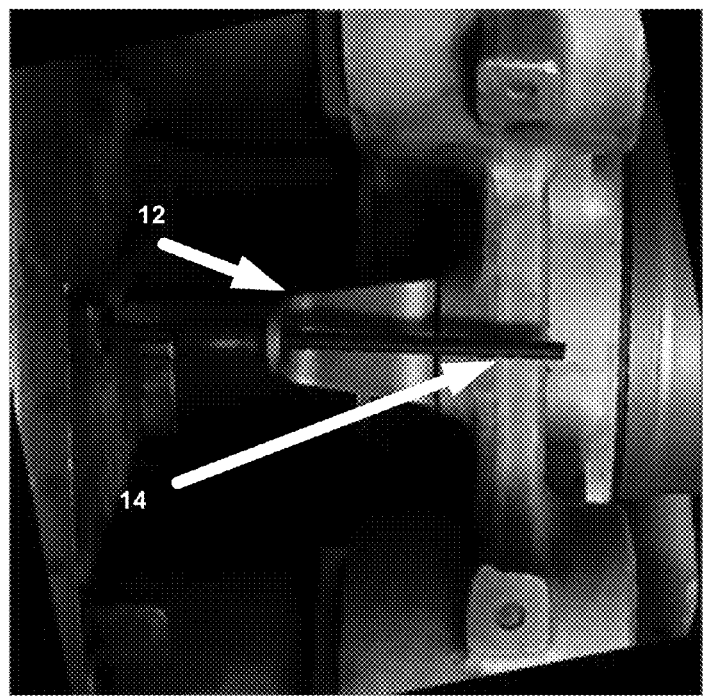

FIG. 3C is an example input image after the input image has been converted to a greyscale version of the input image. In some examples, processor 8 may execute image adjustment module 26 to convert the input image to a greyscale image. By converting the input image to a greyscale image, the storage space needed to hold the file in a computing device may be smaller. Especially in instances where the input image is transferred between an image capture device and a remote server, a greyscale image may allow for faster transmissions due to the smaller file size. Further, generally, wear pin 14 and reference object 12 overlap one another and are distinguishable by what shade of grey each object is. Typically, wear pin 14 tends to be a dark color, and reference object 12 tends to be a light color, though some examples could have a light color wear pin and a dark color reference object. This means that a greyscale image does not impact the ability to discern wear pin 14 from the reference object during the execution of techniques of this disclosure.

In some examples, the quality estimation parameter may be determined based on a contrast of the input image. In such examples, determining whether the quality estimation parameter is within the acceptable range may include processor 8 executing quality control module 28 to convert the input image to a greyscale image. Processor 8 may also execute quality control module 28 to determine an average greyscale value in the greyscale image and to determine a standard deviation of greyscale values in the greyscale image. Processor 8 may then determine that the quality estimation parameter is not within the acceptable range if the standard deviation of greyscale values does not fall within a lower limit and an upper limit. Conversely, processor 8 may determine that the quality estimation parameter is within the acceptable range if the standard deviation of greyscale values falls within the lower limit and the upper limit. If the contrast of the input image is too high or too low, processor 8 and length determination module 30 may not be capable of discerning wear pin 14 and reference object 12 for the purposes of measuring the objects in accordance with techniques described herein. Therefore, measuring the contrast before measuring the objects may save time and processing power when the input image does not meet the requisite quality.

In some examples, the quality estimation parameter may be determined based on a brightness of the input image. In such examples, determining whether the quality estimation parameter is within the acceptable range may include processor 8 executing quality control module 28 to convert the input image to a greyscale image. Processor 8 may also execute quality control module 28 to determine an average greyscale value in the greyscale image. Processor 8 may then determine that the quality estimation parameter is not within the acceptable range if the average greyscale value does not fall within a lower limit and an upper limit. Conversely, processor 8 may determine that the quality estimation parameter is within the acceptable range if the average greyscale value falls within the lower limit and the upper limit. If the average brightness of the input image is too high or too low, processor 8 and length determination module 30 may not be capable of discerning wear pin 14 and reference object 12 for the purposes of measuring the objects in accordance with techniques described herein. Therefore, measuring the brightness before measuring the objects may save time and processing power when the input image does not meet the requisite quality.

Figure 3D:
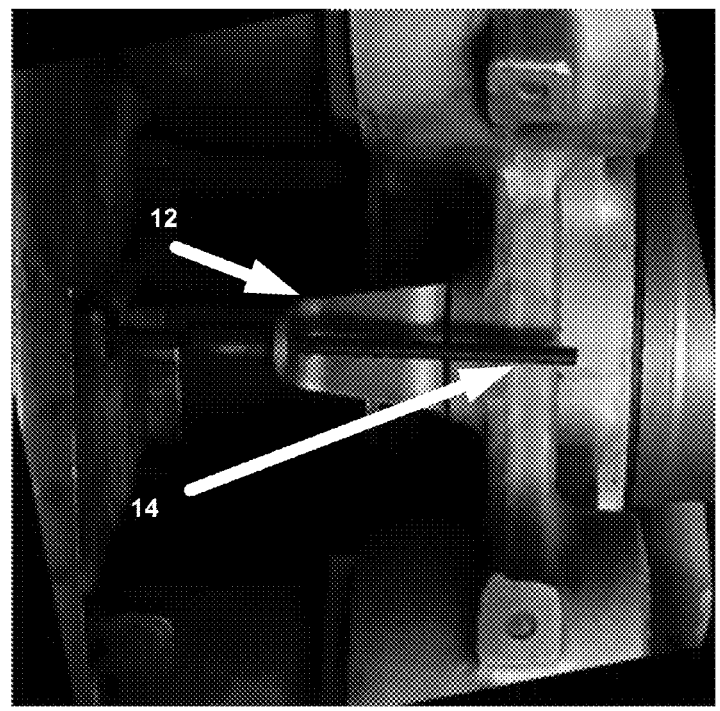

FIG. 3D is an example input image after a smoothing algorithm has been applied to the input image. In some examples, processor 8 may execute image adjustment module 26 to apply a smoothing algorithm to the input image. In some examples, the smoothing algorithm may be a bilateral filter. A bilateral filter is a non-linear, edge-preserving, noise-reducing smoothing filter for images. By preserving the edges in the image, the length of wear pin 14 will not be altered due to edits made to the input image. Instead, the bilateral filter will merely smooth the image such that it is easier to discern wear pin 14 from reference object 12. As discussed above, wear pin 14 and reference object 12 may overlap one another and may be distinguishable by color. By applying the bilateral filter, processor 8 may be able to more effectively determine where the edges of wear pin 14 and reference object 12 are in the input image, allowing for more precise measurements.

Figure 3E:
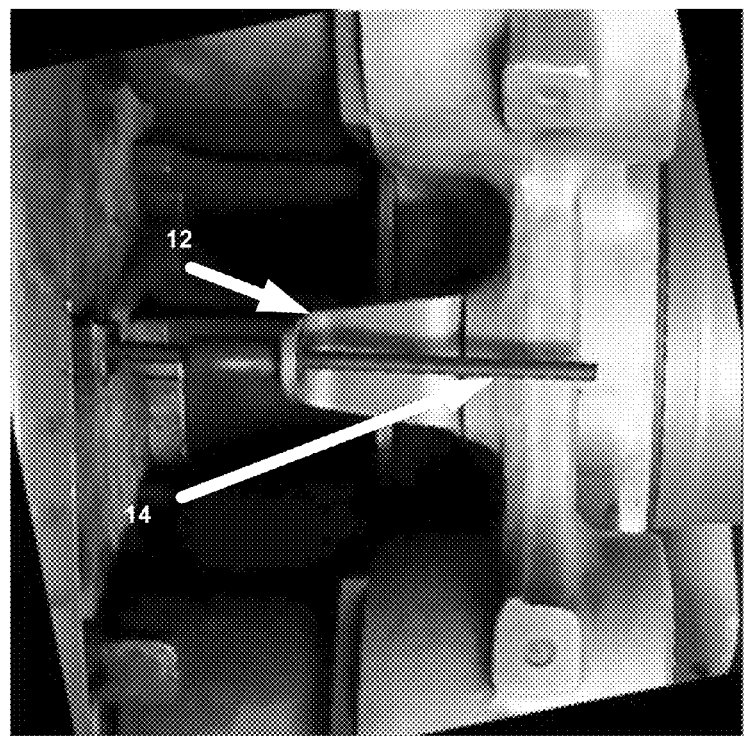

FIG. 3E is an example input image after performing equalization to the input image. In some examples, processor 8 may execute image adjustment module 26 to apply an equalization algorithm to the input image based on one or more lighting conditions. The lighting conditions of the environment in which brake assembly 10 is present may greatly affect the contrast of an image taken in that environment. As discussed above, the ability of processor 8 to discern wear pin 14 from reference object 12 will greatly affect the precision of a measurement for wear pin 14. Therefore, improving the contrast level of the input image may allow for greater precision in measurements. In some examples, image adjustment module 26 may increase the contrast of the input image if the lighting conditions are too dark. Further, image adjustment module 26 may decrease the contrast of the input image if the lighting conditions are too bright.

Figure 3F:
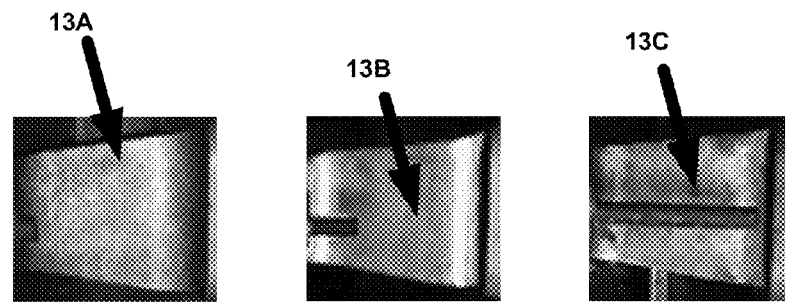

FIG. 3F shows example templates that may be used when identifying portions of a brake assembly. In some examples of techniques of this disclosure, processor 8 may compare portions of the input image to various templates of reference object 12 stored in reference images 32. For example, FIG. 3F shows three different templates for reference object 12. In the group of templates, various sizes and colors of reference object 12 and wear pin 14 may be stored. For instance, template image 13A shows a wider reference object 12 and a short wear pin 14. Template image 13B shows a slightly discolored reference object 12 and a short-medium length wear pin 14. Template image 13C shows a reference object 12 with less taper than the reference objects of 13A and 13B, as well as a long wear pin 14.

Using these templates 13A-13C, processor 8 may determine an area of the input image that resembles one or more of the templates 13A-13C. Processor 8 may then determine an image dimension of reference object 12. For example, processor 8 may execute length determination module 30 to determine, based on the input image, an image dimension of the reference object. The dimension of reference object 12 may be any of a length, a width, a 2D area, a distance between two objects, or any other characteristic that may be measured using techniques described herein. To determine the image dimension of the reference object, processor 8 may execute length determination module 30 to detect a first point of the reference object and a second point of the reference object in the input image. The first point may not intersect with the second point, meaning that the first point and the second point are two discrete, non-connecting line segments. Generally, the first point and the second point may be opposite edges of reference object 12. For example, where reference object 12 is a trapezoidal bracket holding wear pin 14, the first point and the second point may be the two opposite bases of the trapezoidal bracket. Processor 8 may further execute length determination module 30 to determine a number of pixels in a horizontal row that separates the first point and the second point. Further, processor 8 may execute length determination module 30 to determine a length per pixel ratio for the input image based on the number of pixels that separates the first point and the second point and the known dimension of the reference object. For example, if reference object 12 is measured to be 200 pixels, and the reference object is known to have a length of 1.46 inches, then processor 8 can determine that each pixel represents 0.0073 inches. This ratio may be used for other measurements taken based on the input image, including the measurement of the wear pin.

Figure 3G:
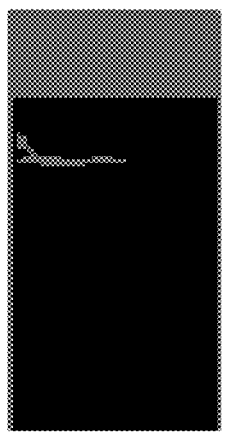
Figure 3G:
Figure 3G:
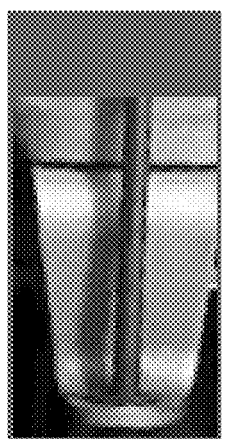

In some examples, the first point and the second point may be determined using an edge detection algorithm, such as a Sobel filter. In other examples, to detect the first point and the second point, processor 8 may execute length determination module 30 to comparing one or more portions of the input image to a template of reference object 12. Such a template of reference object 12 may be stored in reference images database 32 of storage devices 22. Further, processor 8 may execute length determination module 30 to determine, based on the one or more comparisons, a portion of the input image that most closely matches the template of reference object 12 and detect the first point and the second point based on the portion of the input image that most closely matches the template of reference object 12. FIG. 3G is further examples of different images used when measuring the reference object.

Figure 3H:
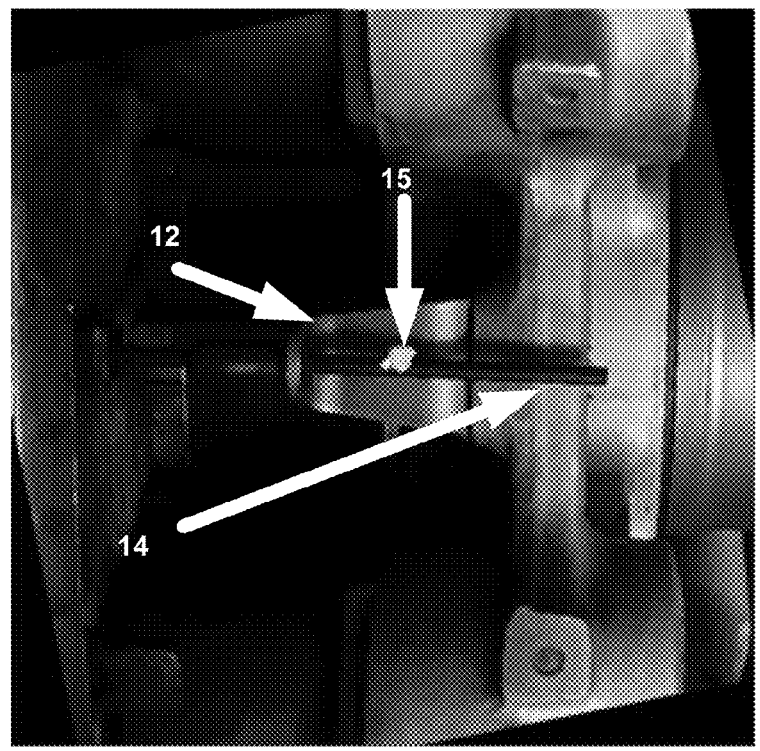

FIG. 3H is an example input image after performing a cluster matching technique to identify a wear pin. Using the templates of FIG. 3F, processor 8 may determine a portion of the input image that most closely resembles wear pin 14. Using these techniques, processor 8 determines that cluster 15 shows a portion of the input image that closely resembles wear pin 14 in the templates 13A-13C.

Figure 3I:
Figure 3I:
Figure 3I:
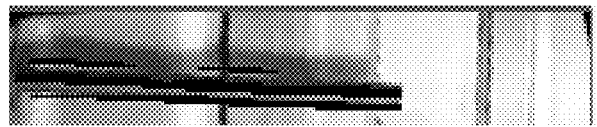
Figure 3I:

FIG. 3I are examples of using various line segments in order to identify the wear pin in the input image. Using the cluster identified in FIG. 3G (i.e., cluster 15), processor 8 may detect edges of wear pin 14 and determine a line segment that substantially connects the first point and the second point. For example, processor 8 may use a Sobel filter and Hough transform to find these edges and segments.

Using this identified cluster 15, processor 8 may be able to use this portion of the input image to determine an image dimension of wear pin 14. For example, processor 8 may execute length determination module 30 to determine, based on the input image, an image dimension of wear pin 14. The dimension of wear pin 14 may be any of a length, a width, a 2D area, or any other characteristic that may be measured using techniques described herein. In determining the image dimension of wear pin 14, processor 8 may execute length determination module 30 to detect a location of wear pin 14. Processor 8 may execute length determination module 30 to detect a first edge of the wear pin in the input image. The first edge represents a fixed end of the wear pin in a bracket assembly. In some examples, the first edge may be determined using an edge detection algorithm, such as a Sobel filter. Further, processor 8 may execute length determination module 30 to identify one or more line segments near wear pin 14 starting at the first edge. Processor 8 may further execute length determination module 30 to identify one or more clusters of the one or more line segments and identify a cluster of the one or more clusters that is coincident with wear pin 14. Processor 8 may further execute length determination module 30 to merge each line segment in the cluster coincident with wear pin 14 and determine a number of pixels corresponding to the length of the merged line segment. In some examples, the identification of one or more horizontal line segments may be accomplished through the application of an edge detection kernel to detect approximately horizontal edges, a determination of pixels with responses above a threshold as horizontal edges, and applying a Hough line transform to each horizontal edge. Processor 8 may execute length determination module 30 to determine a number of pixels in the largest cluster. In cases when the pin is short and contains relatively few pixels, other measures, such as the vertical centrality of each cluster and compactness, may help identify the pin. Though described above as determining horizontal line segments, techniques of this disclosure could also be utilized for a wear pin that is vertical in an input image.

Figure 3J:
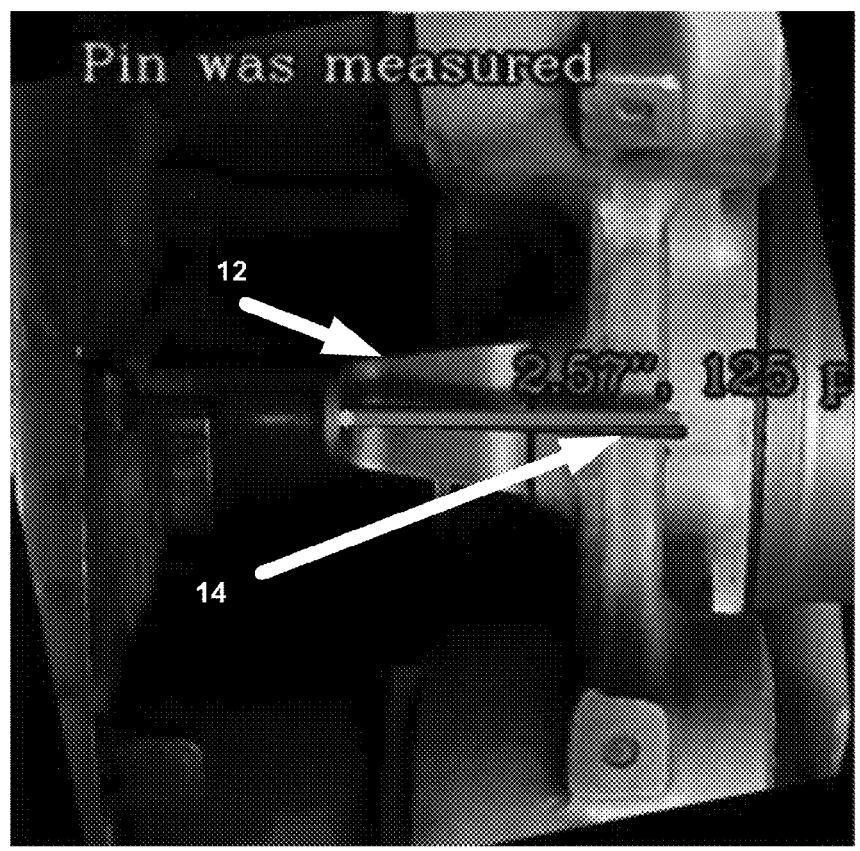

FIG. 3J is an example input image with an overlay of a measured length of a wear pin. Using the measurements of the image dimension of reference object 12, the image dimension of wear pin 14, and the known dimension of reference object 12, processor 8 may determine an estimated measurement of the dimension of wear pin 14. In the example of FIG. 3J, processor 8 further outputs an overlay of the graphical representation of wear pin 14, along with the determined measurement. Processor 8 may output these graphics on user interface device 18.

For example, processor 8 may execute length determination module 30 to determine, based on the image dimension of the reference object, the image dimension of the wear pin, and the known dimension of the reference object, an estimated measurement of the dimension of the wear pin. In some examples, processor 8 may output, on a display operatively connected to image capture device 4 (e.g., user interface device 18) and based on the image dimension of wear pin 14 and the determined estimated measurement of the dimension of wear pin 14, a graphical representation of the determined estimated measurement of the dimension of the wear pin. For example, the graphical representation of the determined estimated measurement of the dimension of wear pin 14 may be a line segment displayed overlaid on top of an approximate location of wear pin 14 in the input image.

In some examples, processor 8 may output, on user interface device 18, a confirmation prompt that the graphical representation is a suitable representation of the determined estimated measurement of the dimension of wear pin 14. This may allow a user to have more visual control of the measurement. If certain conditions in the input image cause the techniques of this disclosure to return an erroneous measurement, the user may be able to rectify this before submitting the measurement by seeing the graphical representation overlaid on top of the discerned and measured wear pin 14.

In some examples, processor 8 may execute length determination module 30 to determine, based on the determined estimated measurement of the dimension of wear pin 14, an estimated remaining life expectancy for wear pin 14. This would provide the user an indication of when wear pin 14 and brake assembly 10 will be in need of repair. In some examples, the estimated remaining life expectancy is an estimated time until replacement for the wear pin. In other examples, the estimated remaining life expectancy is an estimated number of uses until replacement. Further, the life expectancy of wear pin 14 may be different depending on the type of vehicle for which wear pin 14 is being measured. For instance, if the vehicle is a large, passenger aircraft, a wear pin length of 2 inches may have a shorter remaining life expectancy than a wear pin length of 2 inches for a vehicle that is a small, private airplane. Therefore, processor 8 may execute length determination module 30 to determine the estimated remaining life expectancy for the wear pin further based on a vehicle type.

In some examples, processor 8 may execute quality control module 28 to determine a confidence measurement of the estimated measurement of the dimension of the wear pin based on the quality estimation parameter. In some further examples, processor 8 may execute quality control module 28 to prompt a user, via user interface device 18, to re-capture the input image if the confidence measurement is below a threshold confidence level. Processor 8 may further execute quality control module 28 to present an error boundary, via user interface device 18, based on the quality estimation parameter. This may further assist a user in determining whether to accept the measurement provided by image capture device 4 or to re-capture the image using camera 6.

Figure 4:
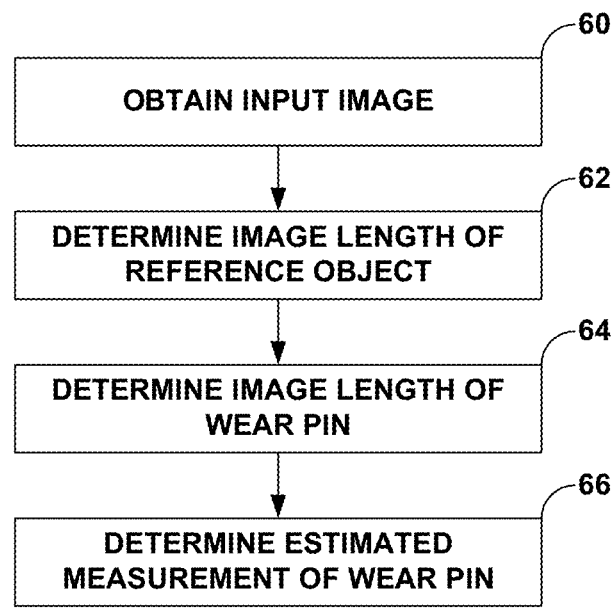
FIG. 4 is a flow diagram illustrating an example process of measuring a wear pin in a brake assembly, in accordance with one or more techniques of the current disclosure.

FIG. 4 is a flow diagram illustrating an example process of measuring a wear pin in a brake assembly, in accordance with one or more techniques of the current disclosure. Techniques of this disclosure describe a system for automatically measuring wear pins based on an input image received from a computing device, such as a handheld device. This handheld device may measure wear pin length during regular intervals throughout the life of the brake. The device may record the aircraft's tail number, location, wheel position and capture an image of the wear pin for each brake location on the aircraft. The device may also enable the ability to capture other defects and brake-related failures. The data and images may then be uploaded to a central repository for analysis. Computer vision algorithms may measure the pin from images of the brake region. The server may then communicate results to the operators. A different version of the program may also perform all image processing locally on the hand held device and provide a real time pin length measurement to the user.

In accordance with techniques of this disclosure, processor 8 may execute image capture module 24 to may obtain an input image of a portion of the brake assembly (e.g., brake assembly 10 of FIG. 1) (60). The input image includes a wear pin (e.g., wear pin 14 of FIG. 1) and a reference object (e.g., reference object 12 of FIG. 1). Reference object 12 has an actual, known length. For example, reference object 12 may comprise a bracket configured to hold wear pin 14. The bracket may be a typical bracket holding wear pin 14 and have a length of 1.46 inches. While this is given as an example, reference object 12 may be any object in brake assembly 10 having a fixed or known length, and the length of reference object 12 may be any length suitable for the function of reference object 12 within brake assembly 10. In some examples, image capture module 24 may capture the input image using camera 6. In some further examples, image capture module 24 may output, on a display operatively connected to camera 6 (e.g., user interface device 18), a prompt to capture the input image. Further, in some examples, image capture module 24 may output, on a preview display operatively connected to the camera (e.g., user interface device 18), a graphical outline overlaid on a preview of the input image. The graphical outline may be displayed such that the portion of brake assembly 10 in the input image should fall within the graphical outline when the input image is captured. In other examples, the reference object may be a bolt in the brake assembly, a distance between two or more bolts near the bracket, or a piston shaft.

In some examples, communication unit 16 may send the input image to a server. In such an example, a computing device operatively connected to the server may configured to utilize techniques described herein to determine the image dimension of the reference object, the image dimension of the wear pin, and the estimated measurement of the dimension of the wear pin. In other words, while techniques of this disclosure are described herein as being performed on the same computing device that captures the input image, in some examples, image capture device 4 may only be configured to capture the input image and send the input image to a remote server that is configured to analyze the input image using techniques of this disclosure.

In some examples, processor 8 may execute image adjustment module 26 to edit the input image such that the wear pin is in the optimal state (e.g., optimal position, contrast, color, etc.) for processor 8 to determine the length of wear pin 14. For example, processor 8 may execute image adjustment module 26 to rotate the input image such that wear pin 14 is approximately horizontal in the rotated input image. In some examples, in rotating the input image, processor 8 may execute image adjustment module 26 to perform edge detection analysis on the input image to detect one or more edges of wear pin 14 and rotate the input image such that the detected edges of wear pin 14 are approximately vertical. In other examples, image adjustment module 26 may rotate the input image such that wear pin 14 is approximately vertical in the rotated input image. In such examples, in rotating the input image, processor 8 may execute image adjustment module 26 to perform edge detection analysis on the input image to detect one or more edges of wear pin 14 and rotate the input image such that the detected edges of wear pin 14 are approximately horizontal.

In some examples, processor 8 may execute image adjustment module 26 to convert the input image to a greyscale image. By converting the input image to a greyscale image, the storage space needed to hold the file in a computing device may be smaller. Especially in instances where the input image is transferred between an image capture device and a remote server, a greyscale image may allow for faster transmissions due to the smaller file size. Further, generally, wear pin 14 and reference object 12 overlap one another and are distinguishable by what shade of grey each object is. Typically, wear pin 14 tends to be a dark color, and reference object 12 tends to be a light color, though some examples could have a light color wear pin and a dark color reference object. This means that a greyscale image does not impact the ability to discern wear pin 14 from the reference object during the execution of techniques of this disclosure.

In some examples, processor 8 may execute image adjustment module 26 to apply a smoothing algorithm to the input image. In some examples, the smoothing algorithm may be a bilateral filter. A bilateral filter is a non-linear, edge-preserving, noise-reducing smoothing filter for images. By preserving the edges in the image, the length of wear pin 14 will not be altered due to edits made to the input image. Instead, the bilateral filter will merely smooth the image such that it is easier to discern wear pin 14 from reference object 12. As discussed above, wear pin 14 and reference object 12 may overlap one another and may be distinguishable by color. By applying the bilateral filter, processor 8 may be able to more effectively determine where the edges of wear pin 14 and reference object 12 are in the input image, allowing for more precise measurements.

In some examples, processor 8 may execute image adjustment module 26 to apply an equalization algorithm to the input image based on one or more lighting conditions. The lighting conditions of the environment in which brake assembly 10 is present may greatly affect the contrast of an image taken in that environment. As discussed above, the ability of processor 8 to discern wear pin 14 from reference object 12 will greatly affect the precision of a measurement for wear pin 14. Therefore, improving the contrast level of the input image may allow for greater precision in measurements. In some examples, image adjustment module 26 may increase the contrast of the input image if the lighting conditions are too dark. Further, image adjustment module 26 may decrease the contrast of the input image if the lighting conditions are too bright.

Processor 8 may execute length determination module 30 to determine, based on the input image, an image dimension of the reference object (62). The dimension of reference object 12 may be any of a length, a width, a 2D area, a distance between two objects, or any other characteristic that may be measured using techniques described herein. To determine the image dimension of the reference object, processor 8 may execute length determination module 30 to detect a first point of the reference object and a second point of the reference object in the input image. The first point may not intersect with the second point, meaning that the first point and the second point are two discrete, non-connecting line segments. Generally, the first point and the second point may be opposite edges of reference object 12. For example, where reference object 12 is a trapezoidal bracket holding wear pin 14, the first point and the second point may be the two opposite bases of the trapezoidal bracket. Processor 8 may further execute length determination module 30 to determine a number of pixels in a horizontal row that separates the first point and the second point. Further, processor 8 may execute length determination module 30 to determine a length per pixel ratio for the input image based on the number of pixels that separates the first point and the second point and the known dimension of the reference object. For example, if reference object 12 is measured to be 200 pixels, and the reference object is known to have a length of 1.46 inches, then processor 8 can determine that each pixel represents 0.0073 inches. This ratio may be used for other measurements taken based on the input image, including the measurement of the wear pin.

In some examples, the first point and the second point may be determined using an edge detection algorithm, such as a Sobel filter. In other examples, to detect the first point and the second point, processor 8 may execute length determination module 30 to comparing one or more portions of the input image to a template of reference object 12. Such a template of reference object 12 may be stored in reference images database 32 of storage devices 22. Further, processor 8 may execute length determination module 30 to determine, based on the one or more comparisons, a portion of the input image that most closely matches the template of reference object 12 and detect the first point and the second point based on the portion of the input image that most closely matches the template of reference object 12.

Processor 8 may execute length determination module 30 to determine, based on the input image, an image dimension of wear pin 14. The dimension of wear pin 14 may be any of a length, a width, a 2D area, or any other characteristic that may be measured using techniques described herein. In determining the image dimension of wear pin 14, processor 8 may execute length determination module 30 to detect a location of wear pin 14. Processor 8 may execute length determination module 30 to detect a first edge of the wear pin in the input image. The first edge represents a fixed end of the wear pin in a bracket assembly. In some examples, the first edge may be determined using an edge detection algorithm, such as a Sobel filter. Further, processor 8 may execute length determination module 30 to identify one or more line segments near wear pin 14 starting at the first edge. Processor 8 may further execute length determination module 30 to identify one or more clusters of the one or more line segments and identify a cluster of the one or more clusters that is coincident with wear pin 14. Processor 8 may further execute length determination module 30 to merge each line segment in the cluster coincident with wear pin 14 and determine a number of pixels corresponding to the length of the merged line segment. In some examples, the identification of one or more horizontal line segments may be accomplished through the application of an edge detection kernel to detect approximately horizontal edges, a determination of pixels with responses above a threshold as horizontal edges, and applying a Hough line transform to each horizontal edge. Processor 8 may execute length determination module 30 to determine a number of pixels in the largest cluster. In cases when the pin is short and contains relatively few pixels, other measures, such as the vertical centrality of each cluster and compactness, may help identify the pin. Though described above as determining horizontal line segments, techniques of this disclosure could also be utilized for a wear pin that is vertical in an input image.

Processor 8 may execute length determination module 30 to determine, based on the image dimension of the reference object, the image dimension of the wear pin, and the known dimension of the reference object, an estimated measurement of the dimension of the wear pin (66). In some examples, processor 8 may output, on a display operatively connected to image capture device 4 (e.g., user interface device 18) and based on the image dimension of wear pin 14 and the determined estimated measurement of the dimension of wear pin 14, a graphical representation of the determined estimated measurement of the dimension of the wear pin. For example, the graphical representation of the determined estimated measurement of the dimension of wear pin 14 may be a line segment displayed overlaid on top of an approximate location of wear pin 14 in the input image.

In some examples, processor 8 may output, on user interface device 18, a confirmation prompt that the graphical representation is a suitable representation of the determined estimated measurement of the dimension of wear pin 14. This may allow a user to have more visual control of the measurement. If certain conditions in the input image cause the techniques of this disclosure to return an erroneous measurement, the user may be able to rectify this before submitting the measurement by seeing the graphical representation overlaid on top of the discerned and measured wear pin 14.

In some examples, processor 8 may execute length determination module 30 to determine, based on the determined estimated measurement of the dimension of wear pin 14, an estimated remaining life expectancy for wear pin 14. This would provide the user an indication of when wear pin 14 and brake assembly 10 will be in need of repair. In some examples, the estimated remaining life expectancy is an estimated time until replacement for the wear pin. In other examples, the estimated remaining life expectancy is an estimated number of uses until replacement. Further, the life expectancy of wear pin 14 may be different depending on the type of vehicle for which wear pin 14 is being measured. For instance, if the vehicle is a large, passenger aircraft, a wear pin length of 2 inches may have a shorter remaining life expectancy than a wear pin length of 2 inches for a vehicle that is a small, private airplane. Therefore, processor 8 may execute length determination module 30 to determine the estimated remaining life expectancy for the wear pin further based on a vehicle type.

In some examples, image capture module 24 may further obtain a one or more subsequent input images (such as via camera 6). The one or more subsequent input images may identify a vehicle associated with brake assembly 10. Processor 8 may execute length determination module 30 to retrieve one or more stored dimensions of wear pin 14 and save the estimated measurement of the dimension as a most recent stored dimension for wear pin 14 of the vehicle associated with brake assembly 10. This stored dimension may be saved in information database 34 of image capture device 4. In other examples, where image capture device 4 communicates with a remote server that determines the estimated measurement of the dimension of wear pin 14, information database 34 may be stored on the remote server. Based on the estimated measurement of the dimension and the one or more stored dimensions in information database 34, processor 8 may further determine an estimated life expectancy of wear pin 14 based on a rate of change. By implementing this feature, studies on the durability of various wear pins can be conducted, as each wear pin for each vehicle will have a history.

Figure 5:
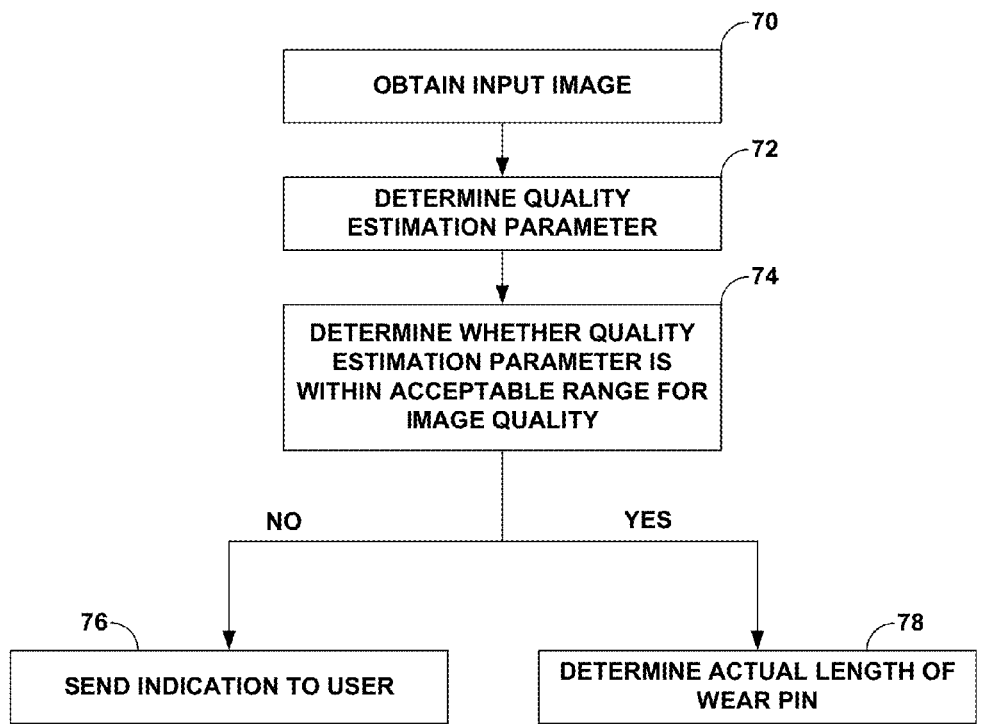
FIG. 5 is a flow diagram illustrating an example process of analyzing a quality estimation parameter of an input image used to measure a wear pin in a brake assembly, in accordance with one or more techniques of the current disclosure.

FIG. 5 is a flow diagram illustrating an example process of analyzing a quality estimation parameter of an input image used to measure a wear pin in a brake assembly, in accordance with one or more techniques of the current disclosure. Techniques may further include quality analysis of input images based on various quality estimation parameters derived throughout the measurement process. For instance, a user who photographs a brake wear pin (or any similar object) with the intent of measuring the length is unaware of how the image's quality affects the measurement. As the images are captured using a handheld device, they may be of a degraded quality due to focus or motion blur. Similarly, the image may be over/under exposed. The image may be required to meet certain quality checks in order for the program to provide a measurement. That is, in some cases, the image may be so poor that obtaining a decent measurement is difficult, and the image should be thrown away. When the program is able to measure a pin, the user may benefit from receiving a confidence score or error interval to understand the probable accuracy. Although the image may represent the scene accurately, the scene may contain elements that are troublesome for the pin-measuring algorithm, such as dirt/grease/grit near the pin or a suboptimal camera pose. These unforeseen elements could cause the pin-measuring algorithm to partially fail. Therefore, software logic may be included to decide when an image is too poor to provide any measurement (i.e., no confidence), and give the user an expected error interval otherwise.

In accordance with techniques of this disclosure, processor 8 may execute image capture module 24 to obtain an input image (70). The input image includes a wear pin (e.g., wear pin 14 of FIG. 1) and a reference object (e.g., reference object 12 of FIG. 1). Reference object 12 has an actual, known length. For example, reference object 12 may comprise a bracket configured to hold wear pin 14. The bracket may be a typical bracket holding wear pin 14 and have a length of 1.46 inches. While this is given as an example, reference object 12 may be any object in brake assembly 10 having a fixed or known length, and the length of reference object 12 may be any length suitable for the function of reference object 12 within brake assembly 10. In some examples, image capture module 24 may capture the input image using camera 6. In some further examples, image capture module 24 may output, on a display operatively connected to camera 6 (e.g., user interface device 18), a prompt to capture the input image. Further, in some examples, image capture module 24 may output, on a preview display operatively connected to the camera (e.g., user interface device 18), a graphical outline overlaid on a preview of the input image. The graphical outline may be displayed such that the portion of brake assembly 10 in the input image should fall within the graphical outline when the input image is captured. In other examples, the reference object may be a bolt in the brake assembly, a distance between two or more bolts near the bracket, or a piston shaft.

In some examples, communication unit 16 may send the input image to a server. In such an example, a computing device operatively connected to the server may configured to utilize techniques described herein to determine the image dimension of the reference object, the image dimension of the wear pin, and the estimated measurement of the dimension of the wear pin. In other words, while techniques of this disclosure are described herein as being performed on the same computing device that captures the input image, in some examples, image capture device 4 may only be configured to capture the input image and send the input image to a remote server that is configured to analyze the input image using techniques of this disclosure.

Processor 8 may execute quality control module 28 to determine a quality estimation parameter for the input image (72). Further, processor 8 may execute quality control module 28 to determine whether the quality estimation parameter is within an acceptable range (74). In response to the quality estimation parameter being not within the acceptable range ("NO" branch of 74), processor 8 may execute quality control module 28 to send an indication to a user (76). In such examples, processor 8 may prompt a user to re-capture the input image using different camera extrinsic properties, such as camera position, camera motion, flash, or other camera settings. In other examples, processor 8 may prompt the user to capture one or more subsequent input images of the portion of the brake assembly with different camera extrinsic properties. If a higher quality input image is captured, techniques described herein may be performed on that input image.

Conversely, in response to the quality estimation parameter being within the acceptable range ("YES" branch of 74), processor 8 may execute length determination module 30 to determine the estimated measurement of the dimension of wear pin 14 based on the input image, as described in detail above (78). Processor 8 may further execute quality control module 28 to dynamically update the threshold value based on one or more environmental conditions, such as lighting or presence of foreign substances (e.g., grease, sludge, scrapes, paint, etc.). In some examples, the quality estimation parameter is determined by the same device that captures the input image (i.e. image capture device 4). In other examples, the quality estimation parameter is determined by a remote server that receives the input image from image capture device 4.

In some examples, the quality estimation parameter may be determined based on a contrast of the input image. In such examples, determining whether the quality estimation parameter is within the acceptable range may include processor 8 executing quality control module 28 to convert the input image to a greyscale image. Processor 8 may also execute quality control module 28 to determine an average greyscale value in the greyscale image and to determine a standard deviation of greyscale values in the greyscale image. Processor 8 may then determine that the quality estimation parameter is not within the acceptable range if the standard deviation of greyscale values does not fall within a lower limit and an upper limit. Conversely, processor 8 may determine that the quality estimation parameter is within the acceptable range if the standard deviation of greyscale values falls within the lower limit and the upper limit If the contrast of the input image is too high or too low, processor 8 and length determination module 30 may not be capable of discerning wear pin 14 and reference object 12 for the purposes of measuring the objects in accordance with techniques described herein. Therefore, measuring the contrast before measuring the objects may save time and processing power when the input image does not meet the requisite quality.

In some examples, the quality estimation parameter may be determined based on a brightness of the input image. In such examples, determining whether the quality estimation parameter is within the acceptable range may include processor 8 executing quality control module 28 to convert the input image to a greyscale image. Processor 8 may also execute quality control module 28 to determine an average greyscale value in the greyscale image. Processor 8 may then determine that the quality estimation parameter is not within the acceptable range if the average greyscale value does not fall within a lower limit and an upper limit. Conversely, processor 8 may determine that the quality estimation parameter is within the acceptable range if the average greyscale value falls within the lower limit and the upper limit. If the average brightness of the input image is too high or too low, processor 8 and length determination module 30 may not be capable of discerning wear pin 14 and reference object 12 for the purposes of measuring the objects in accordance with techniques described herein. Therefore, measuring the brightness before measuring the objects may save time and processing power when the input image does not meet the requisite quality.

In other examples, the quality estimation parameter may be determined based on a blurriness of the input image. In such examples, determining whether the quality estimation parameter is within the acceptable range may include dividing the input image into a plurality of windows. Each window may overlap a portion of each window horizontally adjacent to the respective window. Processor 8 may also execute quality control module 28 to determine a blurriness parameter for each window of the plurality of windows based on a magnitude of a Fast Fourier transform algorithm applied over a percentile of available spatial frequencies. Processor 8 may execute quality control module 28 to determine the quality estimation parameter for the input image as a weighted function of the blurriness parameter for each window. In some examples, the weighted function of the blurriness parameters may be a mean, a minimum function, or a maximum function. In other examples, the weighted function comprises a weight associated with the blurriness parameter each window, wherein the weight associated with the blurriness parameter for a window of the plurality of windows that contains the wear pin is a non-zero value, and wherein the weight associated with the blurriness parameter for each window of the plurality of windows that does not contain the wear pin is a zero value. In other words, only the window that contains wear pin 14 in the input image is used for blurriness quality prediction. Processor 8 may determine that the quality estimation parameter is not within the acceptable range if the quality estimation parameter is below a lower limit of blurriness.

Conversely, processor 8 may determine that the quality estimation parameter is within the acceptable range if the quality estimation parameter is above the lower limit of blurriness. In various examples, the input image may be divided into any number of windows, including one of nine windows, sixteen windows, or twenty-five windows. In some examples, the blurriness parameter for each window is an average of the blurriness for each pixel in the respective window. In other examples, the blurriness parameter for each window is a minimum blurriness for each pixel in the respective window. If the input image is too blurry, processor 8 and length determination module 30 may not be capable of discerning wear pin 14 and reference object 12 for the purposes of measuring the objects in accordance with techniques described herein. Therefore, measuring the blurriness before measuring the objects may save time and processing power when the input image does not meet the requisite quality.

In some examples, processor 8 may execute quality control module 28 to determine a confidence measurement of the estimated measurement of the dimension of the wear pin based on the quality estimation parameter. In some further examples, processor 8 may execute quality control module 28 to prompt a user, via user interface device 18, to re-capture the input image if the confidence measurement is below a threshold confidence level. Processor 8 may further execute quality control module 28 to present an error boundary, via user interface device 18, based on the quality estimation parameter. This may further assist a user in determining whether to accept the measurement provided by image capture device 4 or to re-capture the image using camera 6.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A method of determining a length of a wear pin in a brake assembly, the method comprising:
   obtaining an input image of a portion of the brake assembly, wherein the input image comprises an image of the wear pin and a reference object, and wherein the reference object has a known dimension;
   determining, based on the input image, an image dimension of the reference object;
   determining, based on the input image, an image dimension of the wear pin; and
   determining, based on the image dimension of the reference object, the image dimension of the wear pin, and the known dimension of the reference object, an estimated measurement of the dimension of the wear pin.

2. The method of claim 1, wherein the reference object comprises one of a bracket configured to hold the wear pin, a bolt in the brake assembly, a distance between two or more bolts near the bracket, or a piston shaft.

3. The method of claim 1, wherein obtaining the input image comprises:
   receiving, by a server, the input image from a remote computing device.

4. The method of claim 1, wherein obtaining the input image comprises:
   capturing the input image using a camera.

5. The method of claim 4, further comprising:
   outputting, on a display operatively connected to the camera, a prompt to capture the input image;
   outputting, on a preview display operatively connected to the camera, a graphical outline overlaid on a preview of the input image, wherein the graphical outline is an indication of an optimal area of the input image for the wear pin to fall within when the input image is captured; and
   outputting, on a display operatively connected to the camera and based on the image dimension of the wear pin and the determined estimated measurement of the dimension of the wear pin, a graphical representation of the determined estimated measurement of the dimension of the wear pin, wherein the graphical representation of the determined estimated measurement of the dimension of the wear pin is displayed overlaid on top of an approximate location of the wear pin in the input image.

6. The method of claim 5, further comprising:
   outputting, on the display, a confirmation prompt requesting input indicating whether the graphical representation is a suitable representation of the determined estimated measurement of the dimension of the wear pin or an inadequate representation of the determined estimated measurement of the dimension.

7. The method of claim 1, further comprising:
   rotating the input image such that the wear pin is approximately horizontal in the rotated input Image.

8. The method of claim 7, wherein rotating the input image comprises:
   performing edge detection analysis on the input image to detect one or more edges of the brake assembly; and
   rotating the input image such that the detected edges of the brake assembly are approximately axis-aligned.

9. The method of claim 1, further comprising:
   comparing one or more portions of the input image to one or more templates of the reference object;
   determining a correlation to each template of the one or more templates for each portion of the input image; and
   identifying the reference object in the input image by determining the portion of the one or more portions of the input image which has the highest correlation to a template of the one or more templates.

10. The method of claim 9, wherein determining the estimated remaining life expectancy for the wear pin is further based on a vehicle type, and wherein the estimated remaining life expectancy comprises one of an estimated time until replacement for the wear pin or an estimated number of uses until replacement.

11. The method of claim 1, wherein the input image is a first input image, the method further comprising:
   obtaining a one or more subsequent input images, wherein the one or more subsequent input images identifies a vehicle associated with the brake assembly;
   retrieving one or more stored dimensions of the wear pin; and
   saving the estimated measurement of the dimension as a most recent stored dimension for the vehicle associated with the brake assembly.

12. The method of claim 11, further comprising:
   determining, based on the determined estimated measurement of the dimension of the wear pin and the one or more stored dimensions of the wear pin, an estimated remaining life expectancy for the wear pin based on a rate of change of the wear pin.

13. The method of claim 1, wherein determining the image dimension of the reference object comprises:
detecting a first point on the reference object and a second point on the reference object in the input image, wherein the first point and the second point are on a perimeter of the reference object and are on opposite extremes of the reference object;
determining a number of pixels that separates the first point and the second point; and
determining a length per pixel ratio for the input image based on the number of pixels that separates the first point and the second point and the known dimension of the reference object.

14. The method of claim 1, wherein determining the image dimension of the wear pin comprises:
detecting a location of the wear pin in the input image;
detecting a first point of the wear pin, wherein the first edge represents a fixed end of a bracket assembly;
identifying one or more line segments near the wear pin starting at the first edge;
identifying one or more clusters of the one or more line segments;
identifying a cluster of the one or more clusters that is coincident with the wear pin;
merging each line segment in the cluster coincident with the wear pin;
determining a number of pixels corresponding to the length of the merged line segment.

15. The method of claim 14, wherein identifying the one or more line segments comprises:
applying an edge detection kernel to detect approximately horizontal edges;
determining pixels with responses above a threshold as horizontal edges; and
applying a Hough line transform to the each horizontal edge.

16. The method of claim 1, further comprising:
converting the input image to a greyscale image.

17. The method of claim 1, further comprising:
applying a bilateral filter to the input image.

18. The method of claim 1, further comprising:
applying an equalization algorithm to the input image.

19. The method of claim 1, further comprising:
determining a quality estimation parameter for the input image;
determining whether the quality estimation parameter is within an acceptable range;
in response to the quality estimation parameter being not within the acceptable range, sending an indication to a user; and
in response to the quality estimation parameter being within the acceptable range, determining the estimated measurement of the dimension of the wear pin based on the input image.

20. The method of claim 19, wherein the quality estimation parameter is determined based on a blurriness of the input image, and wherein determining whether the quality estimation parameter is within the acceptable range comprises:
dividing the input image into a plurality of windows, wherein each window overlaps a portion of each window horizontally adjacent to the respective window;
determining a blurriness parameter for each window of the plurality of windows based on a magnitude of a Fast Fourier transform algorithm applied over a percentile of available spatial frequencies;
determining the quality estimation parameter for the input image as a weighted function of the blurriness parameter for each window;
determining that the quality estimation parameter is not within the acceptable range if the quality estimation parameter is below a lower limit of blurriness; and
determining that the quality estimation parameter is within the acceptable range if the quality estimation parameter is above the lower limit of blurriness.

21. The method of claim 20, wherein the weighted function of the blurriness parameter for each window comprises one of a mean function, a minimum function, or a maximum function.

22. The method of claim 20, wherein the weighted function comprises a weight associated with the blurriness parameter for each window, wherein the weight associated with the blurriness parameter for a window of the plurality of windows that contains the wear pin is a non-zero value, and wherein the weight associated with the blurriness parameter for each window of the plurality of windows that does not contain the wear pin is a zero value.

23. The method of claim 19, further comprising:
determining the acceptable range via statistical analysis of the quality estimation parameters calculated on a plurality of previously captured images captured in different environmental conditions and times; and
dynamically updating the acceptable range based on the input image.

24. The method of claim 19, further comprising:
determining a confidence measurement of the estimated measurement of the dimension of the wear pin based on the quality estimation parameter; and
determining an error boundary on the estimated pin length based on the confidence measurement.

25. The method of claim 19, further comprising:
in response to determining that the quality estimation parameter is not within the acceptable range, prompting a user to re-capture the input image.

26. The method of claim 19, further comprising:
in response to determining that the quality estimation parameter is not within the acceptable range, prompting a user to capture one or more subsequent input images of the portion of the brake assembly, wherein the one or more subsequent input images is captured with different camera extrinsic properties.

27. The method of claim 19, wherein the quality estimation parameter is a based on a combination of a contrast parameter, a brightness parameter, and a blurriness parameter.

28. The method of claim 1, wherein the known dimension of the reference object is provided by an external input comprising one or more of a specification sheet, a computer aided design, an engineering diagram, or a database of known dimensions.

29. A system configured to determine a length of a wear pin in a brake assembly, the system comprising:
a camera configured to capture an input image of a portion of the brake assembly, wherein the input image comprises an image of the wear pin and a reference object, and wherein the reference object has an known dimension; and
one or more processors configured to:
determine, based on the input image, an image dimension of the reference object;

determine, based on the input image, an image dimension of the wear pin; and determine, based on the image dimension of the reference object, the image dimension of the wear pin, and the known dimension of the reference object, an estimated measurement of the dimension of the wear pin.

30. A non-transitory computer-readable storage medium comprising instructions that, when executed by one or more processors, cause the one or more processors to:

obtain an input image of a portion of a brake assembly, wherein the input image comprises an image of the wear pin and a reference object, and wherein the reference object has an known dimension;

determine, based on the input image, an image dimension of the reference object;

determine, based on the input image, an image dimension of the wear pin; and determine, based on the image dimension of the reference object, the image dimension of the wear pin, and the known dimension of the reference object, an estimated measurement of the dimension of the wear pin.

\* \* \* \* \*